US010464733B2

(12) United States Patent
Monforton et al.

(10) Patent No.: US 10,464,733 B2
(45) Date of Patent: **\*Nov. 5, 2019**

(54) MICROWAVE FOODSTUFF PACKAGE AND METHOD

(71) Applicants: General Mills, Inc., Minneapolis, MN (US); General Mills Brasil Alimentos Ltda., Sao Paulo (BR)

(72) Inventors: Randal Joseph Monforton, Minnetrista, MN (US); Donald Stephen Mathers, Plymouth, MN (US); Valdir Jose Chiomento, Rio Grande do Sul (BR); Danilo Doriguelo De Melo, Rio Grande do Sul (BR)

(73) Assignees: General Mills, Inc., Minneapolis, MN (US); General Mills Brasil Alimentos Ltda., Sao Paulo (BR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,742

(22) Filed: May 14, 2019

(65) Prior Publication Data

US 2019/0263582 A1    Aug. 29, 2019

Related U.S. Application Data

(63) Continuation of application No. 15/104,796, filed as application No. PCT/US2014/071826 on Dec. 22, 2014, now Pat. No. 10,315,831.

(60) Provisional application No. 61/920,220, filed on Dec. 23, 2013, provisional application No. 61/935,179, filed on Feb. 3, 2014.

(51) Int. Cl.
*B65D 81/34* (2006.01)
*B65D 75/58* (2006.01)
*A23L 7/161* (2016.01)
*B65D 75/00* (2006.01)

(52) U.S. Cl.
CPC .......... *B65D 81/3469* (2013.01); *A23L 7/161* (2016.08); *B65D 75/008* (2013.01); *B65D 75/5805* (2013.01); *A23V 2002/00* (2013.01)

(58) Field of Classification Search
CPC .............. B65D 81/3469; B65D 75/008; B65D 75/5805; A23L 7/161
See application file for complete search history.

(56) References Cited

U.S. PATENT DOCUMENTS

| | | |
|---|---|---|
| 4,810,844 A | 3/1989 | Anderson |
| 4,982,064 A | 1/1991 | Hartman et al. |
| 5,171,950 A | 12/1992 | Brauner et al. |
| 5,223,288 A | 6/1993 | Mendenhall et al. |
| 5,344,661 A | 9/1994 | Mendenhall et al. |
| 5,650,084 A | 7/1997 | Bley |
| D393,590 S | 4/1998 | Roney |
| 5,770,839 A | 6/1998 | Ruebush et al. |
| 5,814,382 A | 9/1998 | Yannuzzi, Jr. |
| 5,826,401 A | 10/1998 | Bois |

(Continued)

FOREIGN PATENT DOCUMENTS

| | | |
|---|---|---|
| JP | 05153926 | 6/1993 |
| WO | 1999/052790 | 10/1999 |

*Primary Examiner* — Viren A Thakur
*Assistant Examiner* — Chaim A Smith
(74) *Attorney, Agent, or Firm* — Diederiks & Whitelaw, PLC; Gregory P. Kaihoi, Esq.

(57) ABSTRACT

Microwave foodstuff packages and methods of making and using the same. The microwave foodstuff packages include only a single gusset and/or a Z-fold configuration.

20 Claims, 9 Drawing Sheets

(56) References Cited

U.S. PATENT DOCUMENTS

| | | | |
|---|---|---|---|
| 6,030,652 A | 2/2000 | Hanus | |
| 6,046,443 A | 4/2000 | Ackerman et al. | |
| D423,923 S | 5/2000 | Sagel | |
| 6,060,096 A | 5/2000 | Hanson et al. | |
| 6,254,907 B1 | 7/2001 | Galomb | |
| D449,979 S | 11/2001 | Planchard | |
| D453,679 S | 2/2002 | Blackburn | |
| D468,196 S | 1/2003 | Graham | |
| D501,410 S | 2/2005 | Lin | |
| D513,192 S | 12/2005 | Lin | |
| D552,482 S | 10/2007 | Lin | |
| D555,009 S | 11/2007 | Lin | |
| D567,668 S | 4/2008 | Lin | |
| 7,504,158 B2 | 3/2009 | Berrier et al. | |
| D597,857 S | 8/2009 | Lin | |
| D602,377 S | 10/2009 | Lin | |
| D613,180 S | 4/2010 | Holt | |
| D671,012 S | 11/2012 | France et al. | |
| D703,547 S | 4/2014 | France et al. | |
| 8,735,786 B2 | 5/2014 | Gorman et al. | |

MICROWAVE FOODSTUFF PACKAGE AND METHOD

RELATED APPLICATIONS

The present application represents a continuation of U.S. patent application Ser. No. 15/104,796 entitled "Microwave Foodstuff Package and Method" filed Jun. 15, 2016, pending, which represents a National Stage application of PCT/US2014/071826 entitled "Microwave Foodstuff Package and Method" filed Dec. 22, 2014, pending, which claims the benefit under 35 U.S.C. Section 119 of U.S. Provisional Application Ser. No. 61/920,220, filed on Dec. 23, 2013 and U.S. Provisional Application Ser. No. 61/935,179, filed on Feb. 3, 2014, all of which are incorporated herein by reference in their entirety to the extent that they do not conflict with the present application.

BACKGROUND OF THE INVENTION

Microwave foodstuff packages and methods of making and using the same are described herein.

Many different foodstuffs can be heated using microwave energy. One product that can be conveniently prepared using microwave energy is popcorn. To conserve space during shipping and storage, microwave popcorn packages are often folded flat. When popped using microwave energy, the popcorn package expands, with the expansion due to the internal pressure of the steam produced by, e.g., the popping of the popcorn kernels, evaporation of the water content of a flavoring slurry, the pressure of the popped kernels themselves, etc. In some instances, the volume of the popped kernels may be increased if the microwave popcorn package expands easily (e.g., does not unduly constrict the volume of the kernels as they pop). Another factor that may, in some instances, increase the volume of the popped kernels is that the number of kernels which are actually popped may be increased by retaining unpopped kernels together on a microwave susceptor with sufficient dwell time to receive sufficient heat energy to result in popping.

One popular form for conventional microwave popcorn packages is a bag having a rectangular top, a rectangular bottom and a pair of gussets formed by folds that extend from a seal at one end of the package to a seal at the opposite end of the package. Although packages in this form are convenient to manufacture, it is difficult for a user to reach the popcorn located in the package after opening because of the relatively narrow shape of the package and location of the opening (which is typically opened by separating the package at one of the end seals). Further, the package typically cannot stand on its own. As a result, most users empty the popcorn from the bag to consume it.

SUMMARY

Microwave foodstuff packages and methods of making and using the same are described herein. In one or more embodiments, the microwave foodstuff packages have a single gusset that provides an expanded shape that can be opened to provide a serving bowl. In one or more embodiments, the microwave foodstuff packages have a Z-fold configuration that may allow for heating of the foodstuff located therein while the package is standing on a side edge.

In one or more embodiments of the microwave foodstuff packages described herein that include only a single gusset panel, the single gusset panel is located between a first panel and a second panel (as compared to conventional microwave popcorn bags which include to gusset panels on opposite sides of the package). The gusset panel extends from a first panel bottom edge fold to a second panel bottom edge fold on one side of the package. The gusset panel includes a gusset panel fold located between the first panel and the second panel. In one or more embodiments, the gusset panel fold extends from the first end to the second end of the package.

In one or more embodiments, the microwave foodstuff packages described herein may include an opening feature defining a line of separation proximate an opening edge fold, with the opening feature being located on an opposite side of the package from the gusset panel. The opening edge fold is formed in sheet material that forms at least a portion of the first panel and at least a portion of the second panel of the microwave foodstuff package. Furthermore, the opening feature is configured to form an opening into the package by separating the sheet material along the line of separation over a majority of a length of the package as measured from the first end to the second end along the opening edge fold.

In one or more embodiments, the microwave foodstuff packages described herein may include a first end seal at the first end of the package. The first end seal includes a panel portion in which the first panel is attached to the second panel with the panel portion of the end seal extending from the opening edge fold to the gusset panel fold. The end seal also includes a first gusset portion in which the first panel is attached to the gusset panel, with the first gusset portion of the end seal extending from the gusset panel fold to the first panel bottom edge fold. The end seal also includes a second gusset portion in which the second panel is attached to the gusset panel, with the second gusset portion of the end seal extending from the gusset panel fold to the second panel bottom edge fold. In one or more embodiments, the first gusset portion and the second gusset portion of the end seal on the same end of the package are connected to each other at a location that is proximate the first panel bottom edge fold and the second panel bottom edge fold.

In one or more embodiments in which the microwave foodstuff packages described herein have a Z-fold configuration, the package may or may not include a single gusset and end seal construction as described in connection with the single gusset embodiments described herein.

In a first aspect, one or more embodiments of a package for microwave heating of product as described herein may include: a first panel extending from a first end to a second end of the package, wherein the first panel also extends from an opening edge fold to a first panel bottom edge fold in a direction transverse to the opening edge fold; a second panel facing the first panel and extending from the first end to the second end of the package, wherein the second panel also extends from the opening edge fold to a second panel bottom edge fold in a direction transverse to the opening edge fold; a gusset panel located between the first panel and the second panel, the gusset panel extending from the first panel bottom edge fold to the second panel bottom edge fold and comprising a gusset panel fold located between the first panel and the second panel, wherein the gusset panel fold extends from the first end to the second end of the package; an opening feature defining a line of separation proximate the opening edge fold, wherein the opening edge fold is formed in sheet material that forms at least a portion of the first panel and at least a portion of the second panel, and wherein the opening feature is configured to form an opening into the package by separating the sheet material along the line of separation over a majority of a length of the package as measured from the first end to the second end along the opening edge fold; and a first end seal at the first end of the package. The first end seal may include: a panel portion extending from the opening edge fold to the gusset panel fold in which the first panel is attached to the second panel; a first gusset portion extending from the gusset panel fold to the first panel bottom edge fold in which the first panel is attached to the gusset panel, wherein the first panel is attached to the gusset panel within a first corner area bounded by the first end of the package, the first panel bottom edge fold and a first corner seal line extending from the gusset panel fold to the first panel bottom edge fold; and a second gusset portion extending from the gusset panel fold to the second panel bottom edge fold in which the second panel is attached to the gusset panel, wherein the second panel is attached to the gusset panel within a second corner area bounded by the first end of the package, the second panel bottom edge fold, and a second corner seal line extending from the gusset panel fold to the second panel bottom edge fold.

In one or more embodiments of the first aspect of the packages described herein, the first corner seal line forms an included angle of 90 degrees or less with the gusset panel fold.

In one or more embodiments of the first aspect of the packages described herein, the first corner seal line forms an included angle of 60 degrees or less with the gusset panel fold.

In one or more embodiments of the first aspect of the packages described herein, the first corner seal line forms an included angle of 30 degrees or more with the gusset panel fold.

In one or more embodiments of the first aspect of the packages described herein, the first corner seal line forms an included angle of 30 degrees or more and 60 degrees or less with the gusset panel fold.

In one or more embodiments of the first aspect of the packages described herein, the first gusset portion of the first end seal comprises a first panel edge seal that is aligned with an edge of the first end of the package between the gusset panel fold and the first panel bottom edge fold, wherein the first panel edge seal extends inwardly towards the second end of the package from the first end of the package. In one or more embodiments, the first gusset portion of the first end seal comprises a first corner seal located between the first corner seal line and first panel edge seal. In one or more embodiments, the first corner seal is discontinuous such that a portion of the first panel is not attached to the gusset panel along the first corner seal line. In one or more embodiments, the first corner seal is continuous between the gusset panel fold and the first panel bottom edge fold such that the first corner seal forms a continuous seal between the first panel and the gusset panel from the gusset panel fold to the first panel bottom edge fold. In one or more embodiments, the first corner seal intersects with the panel portion of the first end seal such that the panel portion of the first end seal and the first corner seal form a continuous seal extending from the opening edge fold to the first panel bottom edge fold. In one or more embodiments, the first panel is not attached to the gusset panel in a portion of the first corner area bounded by the first panel edge seal and the first corner seal. In one or more embodiments, the first panel edge seal and the first corner seal occupy all of the first corner area such that the first panel is attached to the gusset panel within all of the first corner area of the first gusset portion of the first end seal.

In one or more embodiments of the first aspect of the packages described herein, the second corner seal line forms an included angle of 90 degrees or less with the gusset panel fold.

In one or more embodiments of the first aspect of the packages described herein, the second corner seal line forms an included angle of 60 degrees or less with the gusset panel fold.

In one or more embodiments of the first aspect of the packages described herein, the second corner seal line forms an included angle of 30 degrees or more with the gusset panel fold.

In one or more embodiments of the first aspect of the packages described herein, the second corner seal line forms an included angle of 30 degrees or more and 60 degrees or less with the gusset panel fold.

In one or more embodiments of the first aspect of the packages described herein, the second gusset portion of the first end seal comprises a second panel edge seal that is aligned with an edge of the first end of the package between the gusset panel fold and the first panel bottom edge fold, wherein the second panel edge seal extends inwardly towards the second end of the package from the first end of the package. In one or more embodiments, the second gusset portion of the first end seal comprises a second corner seal located between the second corner seal line and second panel edge seal. In one or more embodiments, the second corner seal is discontinuous such that a portion of the second panel is not attached to the gusset panel along the second corner seal line. In one or more embodiments, the second corner seal is continuous between the gusset panel fold and the second panel bottom edge fold such that the second corner seal forms a continuous seal between the second panel and the gusset panel from the gusset panel fold to the second panel bottom edge fold. In one or more embodiments, the second corner seal intersects with the panel portion of the first end seal such that the panel portion of the first end seal and the second corner seal form a continuous seal extending from the opening edge fold to the second panel bottom edge fold. In one or more embodiments, the second panel is not attached to the gusset panel in a portion of the second corner area bounded by the second panel edge seal and the second corner seal. In one or more embodiments, the second panel edge seal and the second corner seal occupy all of the second corner area such that the second panel is attached to the gusset panel within all of the second corner area of the second gusset portion of the first end seal.

In one or more embodiments of the first aspect of the packages described herein, the gusset panel is attached to itself between the first gusset portion and the second gusset portion of the first end seal at a location proximate the first panel bottom edge fold and the second panel bottom edge fold. In one or more embodiments, the gusset panel is attached to itself between the first gusset portion and the second gusset portion of the first end seal along a majority of a distance between the first and second panel bottom edge folds and the gusset panel fold.

In one or more embodiments of the first aspect of the packages described herein, the package comprises a second end seal at the second end of the package that is a mirror image of the first end seal along a mirror line that bisects the package from the opening edge fold to the first and second bottom edge folds. In one or more embodiments, the package comprises foodstuff located between the first and second panels in the package.

In one or more embodiments of the first aspect of the packages described herein, a microwave susceptor is located between the first and second panels in the package.

In one or more embodiments of the first aspect of the packages described herein, the first end seal comprises a vent hole formed through the first and second panels proximate the first end of the package, wherein at least a portion of the first end seal is located between the vent hole and the second end of the package. In one or more embodiments, the vent hole is located between the opening edge fold and the gusset panel fold.

In one or more embodiments of the first aspect of the packages described herein, the package further comprises an overlap seal located in the first panel between the opening edge fold and the first panel bottom edge fold, the overlap seal comprising two layers of the sheet material forming at least a portion of the first panel and at least a portion of the second panel, wherein the overlap seal extends from the first end of the package to the second end of the package. In one or more embodiments, the overlap seal comprises an interior sheet material edge located in an interior of the package and an exterior sheet material edge located on an exterior of the package, and wherein the interior sheet material edge is located between the gusset panel fold and the opening edge fold. In one or more embodiments, the interior sheet material edge is located adjacent the gusset panel fold within the first end seal. In one or more embodiments, the exterior sheet material edge is located between the interior sheet material edge and the opening edge fold. In one or more embodiments, the panel portion of the first end seal comprises two layers of the sheet material in a first area bounded by the opening edge fold and the exterior sheet material edge of the overlap seal and three layers of the sheet material in a second area bounded by the exterior sheet material edge and the interior sheet material edge of the overlap seal.

In a second aspect, one or more embodiments of a package for microwave heating of product as described herein may include: a first panel extending from a first end to a second end of the package, wherein the first panel also extends from an opening edge fold to a first panel bottom edge fold in a direction transverse to the opening edge fold; a second panel facing the first panel and extending from the first end to the second end of the package, wherein the second panel also extends from the opening edge fold to a second panel bottom edge fold in a direction transverse to the opening edge fold; a gusset panel located between the first panel and the second panel, the gusset panel extending from the first panel bottom edge fold to the second panel bottom edge and comprising a gusset panel fold located between the first panel and the second panel, wherein the gusset panel fold extends from the first end to the second end of the package; and a first end seal at the first end of the package, the first end seal comprising a panel portion extending from the opening edge fold to the gusset panel fold in which the first panel is attached to the second panel, a first gusset portion extending from the gusset panel fold to the first panel bottom edge fold in which the first panel is attached to the gusset panel, and a second gusset portion extending from the gusset panel fold to the second panel bottom edge fold in which the second panel is attached to the gusset panel; wherein the gusset panel is attached to itself between the first gusset portion and the second gusset portion of the first end seal at a location proximate the first panel bottom edge fold and the second panel bottom edge fold.

In one or more embodiments of the second aspect of the packages described herein, the gusset panel is attached to itself between the first gusset portion and the second gusset portion of the first end seal along a majority of a distance between the first and second panel bottom edge folds and the gusset panel fold.

In one or more embodiments of the second aspect of the packages described herein, the package further comprises an opening feature defining a line of separation proximate the opening edge fold, wherein the opening edge fold is formed in sheet material that forms at least a portion of the first panel and at least a portion of the second panel, and wherein the opening feature is configured to form an opening into the package by separating the sheet material along the line of separation. In one or more embodiments, after forming the opening using the opening feature, the package comprises a bottom formed by the gusset panel and side walls formed by the first and second panels. In one or more embodiments, the line of separation defined by the opening feature extends from the first end to the second end of the package.

In one or more embodiments of the second aspect of the packages described herein, the opening feature comprises an opening member attached to the sheet material, and wherein the opening member is configured to form an opening into the package by separating the sheet material along the line of separation when the opening member is pulled away from the first panel bottom edge fold. In one or more embodiments, the opening member is positioned between the first and second panels. In one or more embodiments, the opening member is adhesively attached to the sheet material. In one or more embodiments, the opening member extends through the first end seal, and wherein the opening member is configured to separate the sheet material along a line that extends through the first end seal when the opening member is pulled away from the first panel bottom edge fold at a location beginning proximate the second end of the package. In one or more embodiments, the opening feature comprises a line of weakness formed in the first panel and/or the second panel.

In one or more embodiments of the second aspect of the packages described herein, the package comprises a second end seal at the second end of the package that is a mirror image of the first end seal along a mirror line that bisects the package from the opening edge fold to the first and second bottom edge folds. In one or more embodiments, the package comprises foodstuff located between the first and second panels in the package.

In one or more embodiments of the second aspect of the packages described herein, a microwave susceptor is located between the first and second panels in the package.

In one or more embodiments of the second aspect of the packages described herein, the first end seal comprises a vent hole formed through the first and second panels proximate the first end of the package, wherein at least a portion of the first end seal is located between the vent hole and the second end of the package. In one or more embodiments, the vent hole is located between the opening edge fold and the gusset panel fold.

In one or more embodiments of the second aspect of the packages described herein, the package further comprises an overlap seal located in the first panel between the opening edge fold and the first panel bottom edge fold, the overlap seal comprising two layers of the sheet material forming at least a portion of the first panel and at least a portion of the second panel, wherein the overlap seal extends from the first end of the package to the second end of the package. In one or more embodiments, the overlap seal comprises an interior sheet material edge located in an interior of the package and an exterior sheet material edge located on an exterior of the package, and wherein the interior sheet material edge is located between the gusset panel fold and the opening edge fold. In one or more embodiments, the interior sheet material edge is located adjacent the gusset panel fold within the first end seal. In one or more embodiments, the exterior sheet material edge is located between the interior sheet material edge and the opening edge fold. In one or more embodiments, the panel portion of the first end seal comprises two layers of the sheet material in a first area bounded by the opening edge fold and the exterior sheet material edge of the overlap seal and three layers of the sheet material in a second area bounded by the exterior sheet material edge and the interior sheet material edge of the overlap seal.

In a third aspect, one or more embodiments of a package for microwave heating of product as described herein may include: a first panel extending from a first end to a second end of the package, wherein the first panel also extends from an opening edge fold to a first panel bottom edge fold in a direction transverse to the opening edge fold; a second panel facing the first panel and extending from the first end to the second end of the package, wherein the second panel also extends from the opening edge fold to a second panel bottom edge fold in a direction transverse to the opening edge fold; a gusset panel located between the first panel and the second panel, the gusset panel extending from the first panel bottom edge fold to the second panel bottom edge fold and comprising a gusset panel fold located between the first panel and the second panel, wherein the gusset panel fold extends from the first end to the second end of the package; an opening feature defining a line of separation proximate the opening edge fold, wherein the opening edge fold is formed in sheet material that forms at least a portion of the first panel and at least a portion of the second panel, and wherein the opening feature is configured to form an opening into the package by separating the sheet material along the line of separation over a majority of a length of the package as measured from the first end to the second end along the opening edge fold; and a first end seal at the first end of the package, the first end seal comprising a panel portion extending from the opening edge fold to the gusset panel fold in which the first panel is attached to the second panel, a first gusset portion extending from the gusset panel fold to the first panel bottom edge fold in which the first panel is attached to the gusset panel, and a second gusset portion extending from the gusset panel fold to the second panel bottom edge fold in which the second panel is attached to the gusset panel.

In one or more embodiments of the third aspect of the packages described herein, after forming the opening using the opening feature, the package comprises a bottom formed by the gusset panel and side walls formed by the first and second panels.

In one or more embodiments of the third aspect of the packages described herein, the line of separation defined by the opening feature extends from the first end to the second end of the package.

In one or more embodiments of the third aspect of the packages described herein, the opening feature comprises an opening member attached to the sheet material, and wherein the opening member is configured to form an opening into the package by separating the sheet material along the line of separation when the opening member is pulled away from the first panel bottom edge fold. In one or more embodiments, the opening member is positioned between the first and second panels. In one or more embodiments, the opening member is adhesively attached to the sheet material. In one or more embodiments, the opening member extends through the first end seal, and wherein the opening member is configured to separate the sheet material along a line that extends through the first end seal when the opening member is pulled away from the first panel bottom edge fold at a location beginning proximate the second end of the package.

In one or more embodiments of the third aspect of the packages described herein, the opening feature comprises a line of weakness formed in the first panel and/or the second panel.

In one or more embodiments of the third aspect of the packages described herein, the package comprises a second end seal at the second end of the package that is a mirror image of the first end seal along a mirror line that bisects the package from the opening edge fold to the first and second bottom edge folds. In one or more embodiments, the package comprises foodstuff located between the first and second panels in the package.

In one or more embodiments of the third aspect of the packages described herein, a microwave susceptor is located between the first and second panels in the package.

In one or more embodiments of the third aspect of the packages described herein, the first end seal comprises a vent hole formed through the first and second panels proximate the first end of the package, wherein at least a portion of the first end seal is located between the vent hole and the second end of the package. In one or more embodiments, the vent hole is located between the opening edge fold and the gusset panel fold.

In one or more embodiments of the third aspect of the packages described herein, the package further comprises an overlap seal located in the first panel between the opening edge fold and the first panel bottom edge fold, the overlap seal comprising two layers of the sheet material forming at least a portion of the first panel and at least a portion of the second panel, wherein the overlap seal extends from the first end of the package to the second end of the package. In one or more embodiments, the overlap seal comprises an interior sheet material edge located in an interior of the package and an exterior sheet material edge located on an exterior of the package, and wherein the interior sheet material edge is located between the gusset panel fold and the opening edge fold. In one or more embodiments, the interior sheet material edge is located adjacent the gusset panel fold within the first end seal. In one or more embodiments, the exterior sheet material edge is located between the interior sheet material edge and the opening edge fold. In one or more embodiments, the panel portion of the first end seal comprises two layers of the sheet material in a first area bounded by the opening edge fold and the exterior sheet material edge of the overlap seal and three layers of the sheet material in a second area bounded by the exterior sheet material edge and the interior sheet material edge of the overlap seal.

In a fourth aspect, one or more embodiments of a package for microwave heating of product as described herein may include: a first panel and a second panel; wherein the first panel is attached to the second panel at a first end seal along a first end of the package and a second end seal along a second end of the package, and wherein the first panel is attached to the second panel along a first side edge extending from the first end seal to the second end seal of the package, and further wherein the first panel is attached to the second panel along a second side edge extending from the first end seal to the second end seal of the package, wherein the package comprises an interior volume located between the first panel, the second panel, the first and second end seals of the package, and the first and second side edges; a first cross-package fold extending from the first side edge to the second side edge and a second cross-package fold extending from the first side edge to the second side edge; foodstuff located in the interior volume of the package; wherein the package comprises a first portion located between the first end seal of the package and the first cross-package fold, a second portion located between the second end seal of the package and the second cross-package fold, and a central portion located between the first and second cross-package folds; and wherein the first portion faces the second panel in the central portion when folded along the first cross-package fold and the second portion faces the first panel in the central portion when folded along the second cross-package fold.

In a fifth aspect, one or more embodiments of a package for microwave heating of product as described herein may include: a first panel and a second panel;

wherein the first panel is attached to the second panel at a first end seal along a first end of the package and a second end seal along a second end of the package, and wherein the first panel is attached to the second panel along a first side edge extending between the first and second end seals and along a second side edge extending between the first and second end seals; and foodstuff located in an interior volume of the package between the first and second panels; wherein the package is folded in a Z-fold configuration along first and second cross-package folds extending from the first side edge to the second side edge of the package, wherein the first and second panels are folded in a first direction along the first cross-package fold, and wherein the first and second panels are folded in a second direction opposite from the first direction along the second cross-package fold.

In one or more embodiments of the fourth and/or fifth aspects of the packages described herein, a microwave susceptor is located in the interior volume of the package.

In one or more embodiments of the fourth and/or fifth aspects of the packages described herein, the package may include an overlap seal located in the first panel between the first side edge and the second side edge, the overlap seal comprising two layers of sheet material forming at least a portion of the first panel and at least a portion of the second panel, wherein the overlap seal extends from the first end seal to the second end seal of the package.

In one or more embodiments of the fourth and/or fifth aspects of the packages described herein, a vent hole is formed through the first and second panels proximate at least one of the first end seal and the second end seal.

In one or more embodiments of the fourth and/or fifth aspects of the packages described herein, the first side edge comprises an opening edge fold formed by a fold in sheet material that forms at least a portion of both the first panel and the second panel, and wherein the first panel is attached to the second panel along the second side edge of the package by a gusset panel located between the first panel and the second panel, wherein the gusset panel is attached to the first panel along a first panel bottom edge fold located along the second side edge of the package, and wherein the gusset panel is attached to the second panel along a second panel bottom edge fold located along the second side edge of the package, and wherein the gusset panel comprises a gusset panel fold located between the first panel and the second panel, wherein the gusset panel fold extends from the first end seal to the second end seal of the package.

In one or more embodiments of the fourth and/or fifth aspects of the packages that include a gusset panel as described herein, the first end seal comprises: a panel portion extending from the opening edge fold to the gusset panel fold in which the first panel is attached to the second panel; a first gusset portion extending from the gusset panel fold to the first panel bottom edge fold, wherein the first panel is attached to the gusset panel within a first corner area bounded by the first end of the package, the first panel bottom edge fold and a first corner seal line extending from the gusset panel fold to the first panel bottom edge fold; and a second gusset portion extending from the gusset panel fold to the second panel bottom edge fold, wherein the second panel is attached to the gusset panel within a second corner area bounded by the first end of the package, the second panel bottom edge fold, and a second corner seal line extending from the gusset panel fold to the second panel bottom edge fold.

In one or more embodiments of the fourth and/or fifth aspects of the packages that include a gusset panel as described herein, the first corner seal line forms an included angle of 90 degrees or less with the gusset panel fold. In one or more embodiments, the first corner seal line forms an included angle of 60 degrees or less with the gusset panel fold. In one or more embodiments, the first corner seal line forms an included angle of 30 degrees or more with the gusset panel fold. In one or more embodiments, the first corner seal line forms an included angle of 30 degrees or more and 60 degrees or less with the gusset panel fold.

In one or more embodiments of the fourth and/or fifth aspects of the packages that include a gusset panel as described herein, the first gusset portion of the first end seal comprises a first panel edge seal that is aligned with an edge of the first end of the package between the gusset panel fold and the first panel bottom edge fold, wherein the first panel edge seal extends inwardly towards the second end of the package from the first end of the package. In one or more embodiments, the first gusset portion of the first end seal comprises a first corner seal located between the first corner seal line and first panel edge seal. In one or more embodiments, the first corner seal is discontinuous such that a portion of the first panel is not attached to the gusset panel along the first corner seal line. In one or more embodiments, the first corner seal is continuous between the gusset panel fold and the first panel bottom edge fold such that the first corner seal forms a continuous seal between the first panel and the gusset panel from the gusset panel fold to the first panel bottom edge fold. In one or more embodiments, the first corner seal intersects with the panel portion of the first end seal such that the panel portion of the first end seal and the first corner seal form a continuous seal extending from the opening edge fold to the first panel bottom edge fold. In one or more embodiments, the first panel is not attached to the gusset panel in a portion of the first corner area bounded by the first panel edge seal and the first corner seal. In one or more embodiments, the first panel edge seal and the first corner seal occupy all of the first corner area such that the first panel is attached to the gusset panel within all of the first corner area of the first gusset portion of the first end seal.

In one or more embodiments of the fourth and/or fifth aspects of the packages that include a gusset panel as described herein, the second corner seal line forms an included angle of 90 degrees or less with the gusset panel fold. In one or more embodiments, the second corner seal line forms an included angle of 60 degrees or less with the gusset panel fold. In one or more embodiments, the second corner seal line forms an included angle of 30 degrees or more with the gusset panel fold. In one or more embodiments, the second corner seal line forms an included angle of 30 degrees or more and 60 degrees or less with the gusset panel fold.

In one or more embodiments of the fourth and/or fifth aspects of the packages that include a gusset panel as described herein, the second gusset portion of the first end seal comprises a second panel edge seal that is aligned with an edge of the first end of the package between the gusset panel fold and the first panel bottom edge fold, wherein the second panel edge seal extends inwardly towards the second end of the package from the first end of the package. In one or more embodiments, the second gusset portion of the first end seal comprises a second corner seal located between the second corner seal line and second panel edge seal. In one or more embodiments, the second corner seal is discontinuous such that a portion of the second panel is not attached to the gusset panel along the second corner seal line. In one or more embodiments, the second corner seal is continuous between the gusset panel fold and the second panel bottom edge fold such that the second corner seal forms a continuous seal between the second panel and the gusset panel from the gusset panel fold to the second panel bottom edge fold. In one or more embodiments, the second corner seal intersects with the panel portion of the first end seal such that the panel portion of the first end seal and the second corner seal form a continuous seal extending from the opening edge fold to the second panel bottom edge fold. In one or more embodiments, the second panel is not attached to the gusset panel in a portion of the second corner area bounded by the second panel edge seal and the second corner seal. In one or more embodiments, the second panel edge seal and the second corner seal occupy all of the second corner area such that the second panel is attached to the gusset panel within all of the second corner area of the second gusset portion of the first end seal.

In one or more embodiments of the fourth and/or fifth aspects of the packages that include a gusset panel as described herein, the gusset panel is attached to itself between the first gusset portion and the second gusset portion of the first end seal at a location proximate the first panel bottom edge fold and the second panel bottom edge fold. In one or more embodiments, the gusset panel is attached to itself between the first gusset portion and the second gusset portion of the first end seal along a majority of a distance between the first and second panel bottom edge folds and the gusset panel fold.

In one or more embodiments of the fourth and/or fifth aspects of the packages that include a gusset panel as described herein, the package comprises a second end seal at the second end of the package that is a mirror image of the first end seal along a mirror line that bisects the package from the opening edge fold to the first and second bottom edge folds.

In one or more embodiments of the fourth and/or fifth aspects of the packages that include a gusset panel as described herein, the first end seal comprises: a panel portion extending from the opening edge fold to the gusset panel fold in which the first panel is attached to the second panel; a first gusset portion extending from the gusset panel fold to the first panel bottom edge fold in which the first panel is attached to the gusset panel; and a second gusset portion extending from the gusset panel fold to the second panel bottom edge fold; wherein the gusset panel is attached to itself between the first gusset portion and the second gusset portion of the first end seal at a location proximate the first panel bottom edge fold and the second panel bottom edge fold. In one or more embodiments, the gusset panel is attached to itself between the first gusset portion and the second gusset portion of the first end seal along a majority of a distance between the first and second panel bottom edge folds and the gusset panel fold.

In one or more embodiments of the fourth and/or fifth aspects of the packages that include a gusset panel as described herein, the package comprises an opening feature defining a line of separation proximate the opening edge fold, wherein the opening feature is configured to form an opening into the package by separating the sheet material along the line of separation over a majority of a length of the package as measured from the first end to the second end along the opening edge fold. In one or more embodiments, the package comprises a bottom formed by the gusset panel and side walls formed by the first and second panels, after forming the opening using the opening feature. In one or more embodiments, the line of separation defined by the opening feature extends from the first end to the second end of the package. In one or more embodiments, the opening feature comprises an opening member attached to the sheet material, and wherein the opening member is configured to form an opening into the package by separating the sheet material along the line of separation when the opening member is pulled away from the first panel bottom edge fold. In one or more embodiments, the opening member is positioned between the first and second panels. In one or more embodiments, the opening member is adhesively attached to the sheet material. In one or more embodiments, the opening member extends through the first end seal, and wherein the opening member is configured to separate the sheet material along a line that extends through the first end seal when the opening member is pulled away from the first panel bottom edge fold at a location beginning proximate the second end of the package. In one or more embodiments, the opening feature comprises a line of weakness formed in the first panel and/or the second panel. In one or more embodiments, the package comprises a second end seal at the second end of the package that is a mirror image of the first end seal along a mirror line that bisects the package from the opening edge fold to the first and second bottom edge folds.

In a sixth aspect, one or more embodiments of a method of heating a product in a microwave oven as described herein may include: standing a side edge of a Z-folded package on a support surface, wherein the Z-folded package comprises a first panel attached to a second panel to form an interior volume between the first and second panels, wherein foodstuff is located in the interior volume, and wherein the package comprises first and second folds defining first and second fold lines extending upward from the support surface wherein the first and second panels are folded in a first direction along the first fold line, and wherein the first and second panels are folded in a second direction opposite from the first direction along the second fold line; and heating the foodstuff using microwave energy while the Z-folded package is standing on the support surface.

In one or more embodiments of the sixth aspect, the Z-folded package may be in the form of any one of the various packages described herein.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other only and, depending on the orientation of the package when used, may or may not accurately describe the relative positions of the recited features with respect to the ground. For example, the opening edge fold as recited herein may or may not be on the top of the package as it is used, stored, transported, etc.

The above summary is not intended to describe each embodiment or every implementation of the microwave foodstuff packages or methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
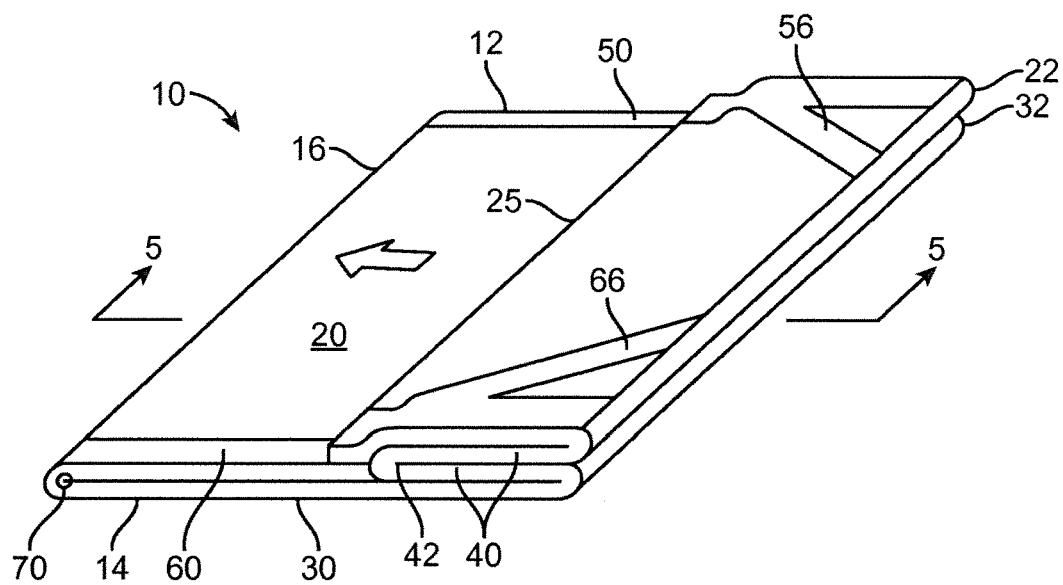
FIG. 1 is a perspective view of one illustrative embodiment of a microwave foodstuff package as described herein before being expanded during the heating of foodstuff viewed as if the package were lying on a horizontal surface (such as that found in, e.g., a microwave oven).

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a microwave foodstuff package as described herein is depicted in FIGS. 1-6. As seen in those figures, the package 10 includes a first end 12 and a second end 14. The package 10 also includes an opening edge fold 16 and a first panel bottom edge fold 22 along with a second panel bottom edge fold 32. The package 10 can be described as having a first panel 20 that extends from the first end 12 to the second end 14 of the package. The first panel 20 also extends from the opening edge fold 16 to the first panel bottom edge fold 22 in a direction that is transverse to the direction along which the opening edge fold 16 extends. The package 10 also includes a second panel 30 that faces the first panel 20 and also extends from the first end 12 to the second end 14 of the package 10. Similar to the first panel 20, the second panel 30 also extends from the opening edge fold 16 to the second panel bottom edge fold 32 in a direction that is transverse to the direction along which the opening edge fold 16 extends.

The package 10 further includes a gusset panel 40 that is located between the first panel 20 and the second panel 30. The gusset panel 40 extends from the first panel bottom edge fold 22 to the second panel bottom edge fold 32 and includes a gusset panel fold 42 that is located between the first panel 20 and the second panel 30. In one or more embodiments, the gusset panel fold 42 is located between the opening edge fold 16 and the first panel bottom edge fold 22 (as well as the second panel bottom edge fold 32). In one or more embodiments, the gusset panel fold 42 extends from the first end 12 to the second end 14 of the package 10.

Referring FIGS. 1-4, use of the package 10 in which the package 10 is expanded by eating of foodstuff located therein can be described along with opening of the package to provide convenient access to the foodstuff located therein. In particular, FIG. 1 is a perspective view of the microwave foodstuff package 10 before being expanded during the heating of foodstuff viewed as if the package 10 were lying on a horizontal surface (such as that found in, e.g., a microwave oven). The arrow seen on the first panel 20 pointing in the direction of the opening edge fold 16 can be used in the various views as an indicator of orientation of the package during use. For example, the package 10 will typically be located flat on a horizontal surface during heating of the foodstuff located therein.

As the foodstuff is heated and expands the package 10 the gusset panel 40 unfolds such that the gusset panel fold 42 moves away from the opening edge fold 16 while the first panel bottom edge fold 22 moves away from the second panel bottom edge fold 32. Further, the gusset panel fold 42 moves towards the first panel bottom edge fold 22 and the second panel bottom edge fold 32, with the gusset panel 40 taking a generally flat shape as seen in, e.g., FIG. 2.

Figure 2:
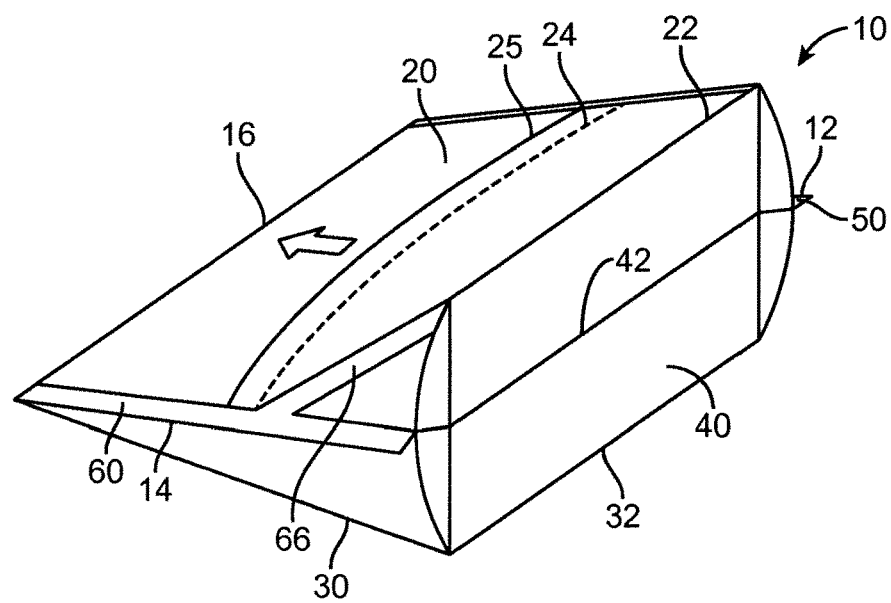
FIG. 2 is a perspective view of the same package after expansion on the horizontal surface.
Figure 3:
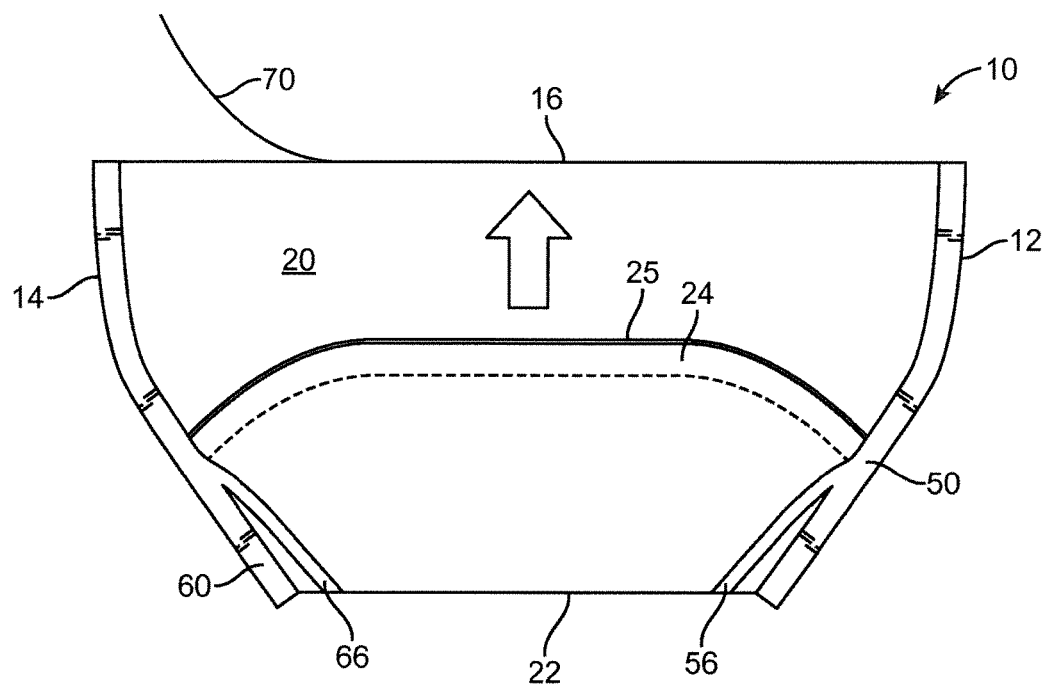
FIG. 3 is a side elevational view of the package of FIG. 2 after being rotated to an upright position in which the opening edge fold 16 is located at a top of the package.
Figure 4:
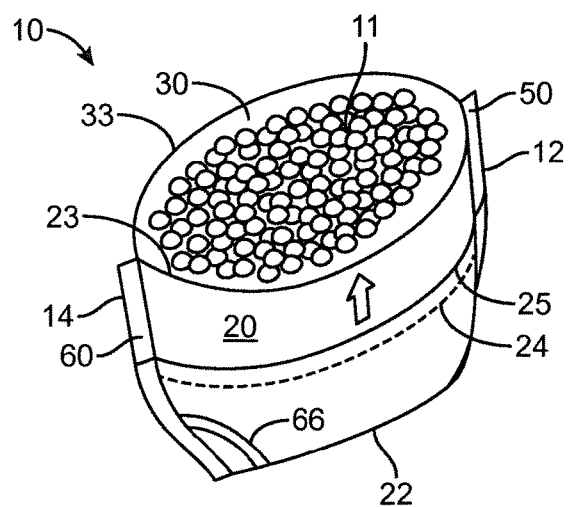
FIG. 4 is a perspective view of the package of FIG. 3 after the package has been opened to allow access to the foodstuff located therein, with the package providing a generally bowl-shaped container.

In those embodiments in which the gusset portions of the first end seal 50 and/or the second end seal 60 are connected to each as described herein, the first end seal 50 and/or the second end seal 60 remain connected after expansion of the package 10 as seen in, e.g., FIGS. 2-4. In one or more embodiments, the gusset panel 40 may be attached to itself between the first gusset portion and the second gusset portion of the end seals at one or both ends of the package 10 at a location proximate the first panel bottom edge fold 22 and the second panel bottom edge fold 32 (where "proximate" as used herein means closer to the corner defined by the respective bottom edge fold 22/32 and the end 12 of the package 10 that the junction between the gusset panel fold 42 and the end 12 of the package 10). In one or more embodiments, the gusset panel 40 is attached to itself between the first gusset portion and the second gusset portion of the first end seal 50 along a majority of the distance between the first and second panel bottom edge folds 22 and 32 and the gusset panel fold 42.

Expansion of the microwave foodstuff packages described herein is typically caused by, e.g., steam generated by the foodstuff as well as expansion of the foodstuff itself (e.g., the popping of corn kernels, etc.). As indicated by the arrow on the first panel 20 of the package 10 in FIGS. 1 and 2, the orientation of the package 10 on a horizontal surface is essentially unchanged during expansion of the package 10. Because the package 10 includes only a single gusset, only one side of the package expands during heating of the foodstuff located therein. As a result, the side of the package 10 along the opening edge fold 16 does not expand.

With the package 10 expanded as seen in FIG. 2, the expanded package 10 may be placed in a serving orientation as depicted in FIG. 3, in which the gusset panel 40 forms the bottom of the package 10 with the opening edge fold 16 located at the top of the package 10. In this orientation, the arrow located on first panel 20 of the package 10 is now pointing upward towards the opening edge fold 16.

Another feature depicted in FIG. 3 is the use of opening feature 70 to separate the sheet material forming the first side panel 20 and the second side panel 30 along the opening edge fold 16 as described herein. In particular, opening feature 70 is depicted as being pulled away from the first panel bottom edge fold 22 at a location beginning near the second end 14 of the package 10. As described herein, the opening member 70 is configured to separate the sheet material of the package 10 along a line of separation that, in one or more embodiments, extends from the first end 12 of the package 10 to the second end 14 of the package 10.

The package 10 is depicted in its opened form in which the package 10 provides a generally bowl-shaped container in the perspective view of FIG. 4. Because the package 10 has been opened along the opening edge fold 16 (see, e.g., FIG. 3), the first panel 20 terminates at an upper edge 23 while the second panel 30 terminates at an upper edge 33. The first panel 20 and second panel 30 can be conveniently shaped such that the upper edges 23 and 33 of the first panel 20 and second panel 30 form an opening through which the foodstuff 11 located in the package 10 can be accessed. When opened as seen in FIG. 4, the package 10 has a base formed by the unfolded gusset panel 40 which, in one or more embodiments, provides a relatively stable base such that the package 10 can remain standing in an upright position without any external stabilization.

Figure 5:
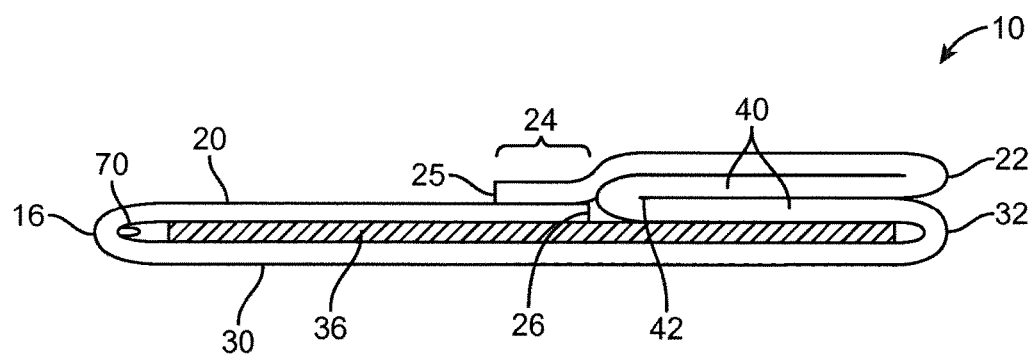
FIG. 5 is a cross-sectional view of the package of FIG. 1 taken along line 5-5 in FIG. 1.

As seen in, e.g., FIGS. 1, 3, and 5, one or more embodiments of the microwave foodstuff packages described herein may include an opening feature 70 that defines a line of separation proximate the opening edge fold 16. As used herein, the phrase "proximate the opening edge fold" means that the opening feature 70 and the line of separation that it defines are located closer to the opening edge fold 16 than the gusset panel fold 42 or either of the bottom edge folds 22 and 32 in the package 10. In one or more embodiments, the phrase "proximate the opening edge fold" means that the opening feature 70 and the line of separation defined by it may be located within 1 centimeter or less of the opening edge fold 16 along the length of the package 10 as measured from the first end 12 to the second end 14. In one or more alternative embodiments, the phrase "proximate the opening edge fold" means that the opening feature 70 and the line of separation defined by it may be located within 2 cm or less of the opening edge fold 16.

The illustrative embodiment of opening feature 70 as depicted in FIGS. 1 and 3 is in the form of a string or similar article, e.g., cable, thread, wire, etc. Regardless of the actual form of the opening feature 70, it is configured to form an opening into the package 10 by separating the sheet material (in which the opening edge fold 16 is formed) along a line of separation. That line of separation is, in one or more embodiments, formed by a user pulling the opening feature 70 away from the gusset panel 40 and/or the bottom edge folds 22 and 32 as depicted in, e.g., FIG. 3. As a result, in one or more embodiments the opening feature 70 possesses sufficient tensile strength to separate the sheet material along the line of separation proximate the opening edge fold 16 when pulled by a user opening the package. In one or more embodiments, the line of separation defined by the opening feature 70 extends over a majority of a length (or, in one or more embodiments, the entire length) of the package 10 as measured from the first end 12 to the second end 14 along the opening edge fold 16. In one or more embodiments, the opening feature 70 may also extend through the first end seal 50 and the second end seal 60 such that the package 10 can be opened by separating the sheet material beginning at the second end 14 and progressing to the first end 12 or in the opposite direction, i.e., beginning at the first end 12 and progressing to the second end 14.

In one or more embodiments in which the opening feature 70 is provided in the form of a string or thread, it may be reinforced by the use of adhesives or other materials which, in addition to reinforcing the string or thread, may also assist in retaining the opening feature 70 proximate the opening edge fold 16 in the package 10 (e.g., the opening feature 70 may be adhesively attached to the sheet material forming one or both of the first panel 20 and second panel 30).

In one or more embodiments, the opening feature 70 may extend through the first end seal 50 to the first end 12 of the microwave foodstuff package 10. Extending the opening feature 70 through the first end seal 50 may facilitate separation of the sheet material along the line of separation through the entire first end seal 50. Similarly, in one or more embodiments the opening feature 70 may extend through the second end seal 60 to the second end 14 of the microwave foodstuff package 10. As such, separation of the sheet material along the line of separation through the entire second end seal 60 may also be facilitated.

Another optional feature that may be included in one or more embodiments of the microwave foodstuff packages described herein is in the form of an overlap seal 24 and is depicted in FIGS. 1-5. In the depicted embodiment, the overlap seal 24 is located in the first panel 20 between the opening edge fold 16 and the first panel bottom edge fold 22. The overlap seal 24 includes two layers of the sheet material forming at least a portion of the first panel 20. The overlap seal 24 includes an exterior sheet material edge 25 located on an exterior of the package 10 and an interior sheet material edge 26 located in the interior of the package 10.

In one or more embodiments, the interior sheet material edge 26 is located between the gusset panel fold 42 and the opening edge fold 16. In one or more embodiments, the exterior sheet material edge 25 may be located between the interior sheet material edge 26 and the opening edge fold 16 such that, for example, the overlap seal 24 is located between the exterior sheet material edge 25 and the gusset panel fold 42 when the package 10 is viewed from either the first panel 20 or the second panel 30.

In one or more embodiments, the interior sheet material edge 26 may be located adjacent the gusset panel fold 42 at least within the first end the seal 50, if not along the entire length of the gusset panel fold 42. In one or more embodiments, the interior sheet material edge 26 may be located within an average distance of 1/8 inch (e.g., 3 millimeters) or less of the gusset panel fold 42 as measured along a line transverse to the direction of travel of the gusset panel fold 42. In one or more embodiments, the interior sheet material edge 26, if not located close or adjacent to the gusset panel fold 42, may be located further away from the gusset panel fold 42 so that any unevenness caused by the thickness of the interior sheet material edge 26 does not adversely affect sealing along the edge of the package 10. For example, in one or more embodiments, the interior sheet material edge 26 may be 1 inch (e.g., 25 millimeters) or more from the gusset panel fold 42 in such an arrangement.

Placement of the interior sheet material edge 26 close to the gusset panel fold 42 may, in one or more embodiments, facilitate sealing of the various layers of sheet material within the end seals 50 and 60 of the microwave foodstuff packages described herein by providing a stepped transition from an area in which four layers of sheet material are located (as found in the package between the gusset panel fold 42 and the first and second panel bottom edge folds 22 and 32) to an area in which three layers of sheet material are located (as found in the overlap seal 24). Furthermore, another stepped transition is found in moving from the overlap seal 24 towards the opening edge fold 16. In particular, three layers of sheet material are found in the area occupied by the overlap seal 24 (i.e., the two layers of material found in the overlap seal 24 itself and the second panel 30), while only two layers of material are found in the area between the overlap seal 24 and the opening edge fold 16. This feature may, for example, be seen in the microwave foodstuff package 10 as depicted in the cross-sectional view of FIG. 5.

Although the overlap seal 24 is shown in a particular location in the first panel 20, in one or more alternative embodiments the overlap seal may be located in a variety of different locations in a first panel 20, in a second panel 30, and/or in gusset panel 40. Furthermore, although the illustrative embodiment of package 10 includes only one overlap seal, one or more alternative embodiments of microwave foodstuff packages as described herein may include two or more overlap seals. In one or more alternative embodiments, one or more seals other than overlap seals may be used in the microwave foodstuff packages described herein, such as, for example, fin seals, etc.

The use of a single overlap seal in a microwave foodstuff package such as that depicted in FIGS. 1-6 may allow for the use of a continuous layer of sheet material to form the first panel 20, second panel 30, and gusset panel 40. In a package which includes more than one overlap seal, the microwave foodstuff packages as described herein can be manufactured of two or more separate sheets of material.

Referring to, e.g., FIGS. 1-4 and 6, the illustrative embodiment of a microwave foodstuff package 10 as depicted therein includes a first end seal 50 located along the first end 12 of the package 10 from the opening edge fold 16 to the bottom edge folds 22 and 32. That illustrative embodiment of package 10 also includes a second end seal 60 located along the second end 14 of the package 10 from the opening edge fold 16 to the bottom edge folds 22 and 32. In one or more embodiments, the microwave foodstuff packages as described herein may include only one end seal where, for example, a packaging manufacturer may be used to construct packages that may then be sold or otherwise transferred to another entity for filling with a selected foodstuff. After the packages have been filled with a selected foodstuff, the second end of the package may be sealed as, for example, described herein.

The facing surfaces of the first panel 20 and the second panel 30 are attached to each other in the area of the first end seal 50 between the opening edge fold 16 and the gusset panel fold 42. The facing surfaces of the first panel 20 and the gusset panel 40 are attached to each other in the area of the first end seal 50 found between the gusset panel fold 42 and the first panel bottom fold 22. The facing surfaces of the second panel 30 and the gusset panel 40 are attached to each other in the area of the first end seal 50 found between the gusset panel fold 42 and the second panel bottom fold 32.

The end seals 50 and 60 may, in one or more embodiments, be secure and robust enough such that the passage of liquids and solids between those facing surfaces is prohibited during normal use of the microwave foodstuff package 10. The end seals 50 and 60 can be formed using many different materials and/or techniques including, but not limited to, heat seals, cold seals, adhesives, cohesives, etc. the particular choice of materials and/or techniques used to form the end seals 50 and 60 will depend on a variety of factors including the materials used in the package 10 as well as the foodstuffs located within the package. Furthermore, in one or more embodiments the end seals 50 and 60 may be similar to each other, however, in one or more alternative embodiments the end seals 50 and 60 may be constructed differently from each other. For example, end seal 50 could be a heat seal construction, while end seal 60 could be formed by a cold seal or other technique.

Another optional feature that may form a part of one or more embodiments of the microwave foodstuff packages described herein includes corner seals. In the depicted embodiment, the package 10 includes a first corner seal 56 in which the first panel 20 is attached to the gusset panel 40 between the first panel bottom edge fold 22 and the gusset panel fold 42. The first corner seal 56 is located between the first end seal 50 and the second end 14 of the package 10. In one or more embodiments, the first corner seal 56 may be in the form of a continuous line of attachment extending from the first end seal 50 to the first panel bottom edge fold 22. In particular, the first corner seal 56 may intersect the first end seal 50 at a location intermediate the opening edge fold 16 and the first panel bottom edge fold 22. Even more particularly, the first corner seal 56 may intersect the first end seal 50 at a location that is closer to the gusset panel fold 42 than either of the opening edge fold 16 or the first panel bottom edge fold 22.

In one or more embodiments, the first corner seal 56 may limit the passage of material between the first panel 20 and the gusset panel 40 towards the corner of the package as defined at the junction between the first end seal 50 and the first panel bottom edge fold 22. To limit the passage of material to that corner, the first corner seal 56 may or may not be in the form of a continuous line of attachment extending from the first end seal to the first panel bottom edge fold 22. For example, in one or more embodiments, the first corner seal 56 may be provided as only one point of attachment between the first panel 20 and the gusset panel 40 along a first corner seal line that extends through the first corner seal 56 along its length from the first end seal 50 to the first panel bottom edge fold 22. In one or more alternative embodiments, the first corner seal 56 may be provided as two or more points of attachment between the first panel 20 and the gusset panel 40 along a first corner seal line that extends through the first corner seal 56 along its length from the first end seal 50 to the first panel bottom edge fold 22.

Figure 6:
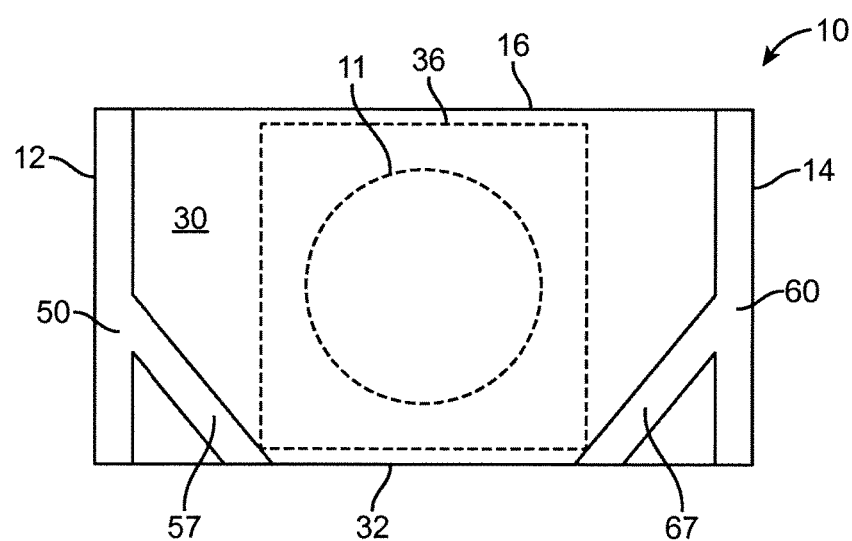
FIG. 6 is a plan view of the illustrative embodiment of microwave foodstuff package as depicted in FIG. 3 which includes, in broken lines, the microwave susceptor and foodstuff located within the package.

A first corner seal 56 is visible in the views of the illustrative embodiment of microwave foodstuff package 10 seen in FIGS. 1 and 3. Referring to FIG. 6, the opposite side of the microwave foodstuff package 10 formed by second panel 30 is seen in a plan view along with a second corner end seal 57 that is formed between the second panel 30 and the gusset panel 40. In one or more embodiments, the second corner end seal 57 may preferably, but not necessarily, be similar in all characteristics to the first corner end seal 56 formed between the first panel 20 and the gusset panel 40.

As a result, the second corner seal 57 involves attachment of the second panel 30 to the gusset panel 40 between the second panel bottom edge fold 32 and the gusset panel fold 42. The second corner seal 57 is located between the first end seal 50 and the second end 14 of the package 10. In one or more embodiments, the second corner seal 57 may be in the form of a continuous line of attachment extending from the first end seal 50 to the second panel bottom edge fold 32. In particular, the second corner seal 57 may intersect the first end seal 50 at a location intermediate the opening edge fold 16 and the second panel bottom edge fold 32. Even more particularly, the second corner seal 57 may intersect the first end seal 50 at a location that is closer to the gusset panel fold 42 than either of the opening edge fold 16 or the second panel bottom edge fold 32.

In one or more embodiments, the second corner seal 57 may limit the passage of material between the second panel 30 and the gusset panel 40 towards the corner of the package as defined at the junction between the first end seal 50 and the second panel bottom edge fold 32. To limit the passage of material to that corner, the second corner seal 57 may not be in the form of a continuous line of attachment extending from the first end seal 50 to the second panel bottom edge fold 32. For example, in one or more embodiments, the second corner seal 57 may be provided as only one point of attachment between the second panel 30 and the gusset panel 40 along a second corner seal line that extends through the second corner seal 57 along its length from the first end seal 50 to the second panel bottom edge fold 32. In one or more alternative embodiments, the second corner seal 57 may be provided as two or more points of attachment between the second panel 30 and the gusset panel 40 along a second corner seal line that extends through the second corner seal 57 along its length from the first end seal 50 to the second panel bottom edge fold 32.

In one or more embodiments, the first end seal 50 of microwave foodstuff packages as described herein may be described as having a panel portion that extends from the opening edge fold 16 to the gusset panel fold 42. The panel portion of the first end seal is an area in which the first panel 20 is attached to the second panel 30. The first end seal 50 may also be described as including a first gusset portion that extends from the gusset panel fold 42 to the first panel bottom edge fold 22. The first panel 20 is attached to the gusset panel 40 in the first gusset portion of the first end seal 50. Further, the first end seal 50 may also be described as having a second gusset portion that extends from the gusset panel fold 42 to the second panel bottom edge fold 32 in which the second panel 30 is attached to the gusset panel 40.

In one or more embodiments, the first gusset portion of the first end seal 50 (i.e., the portion of the first end seal 50 in which the first panel 20 is attached to the gusset panel 40 as described above) and the second gusset portion of the first end seal 50 (i.e. the portion of end seal 50 in which the second panel 30 is attached to the gusset panel 40 as described above) are connected to each other at a location that is proximate the first panel bottom edge fold 22 and the second panel bottom edge fold 32. As used in this context, the term "proximate" means that the location at which the first gusset portion and the second gusset portion of the first end seal 50 are attached to each other is closer to the first panel bottom edge fold 22 and the second panel bottom edge fold 32 than the gusset panel fold 42. In one or more embodiments, the first gusset portion and the second gusset portion of the first end seal 50 may be attached to each other along the entire length of the first gusset portion and the second gusset portion from the gusset panel fold 42 to the first panel bottom edge fold 22 and the second panel bottom edge fold 32.

As described herein, the microwave foodstuff package 10 may, in one or more embodiments, also include a second end seal 60 located along the second end 14 of the package 10 from the opening edge fold 16 to the bottom edge folds 22 and 32. The second end seal 60 includes attachments between the facing surfaces of the first panel 20 and the second panel 30 in the portion of end seal 60 located between the opening edge fold 16 and the gusset panel fold 42. The second end seal 60 also includes attachment between the facing surfaces of the first panel 20 with the gusset panel 40 in the portion of end seal 60 located between the gusset panel fold 42 and the first panel bottom fold 22. The second end seal 60 also includes attachment between the facing surfaces of the second panel 30 with the gusset panel 40 in the portion of end seal 60 located between the gusset panel fold 42 and the second panel bottom fold 32.

Another optional feature that may form a part of one or more embodiments of the microwave foodstuff packages described herein includes corner seals proximate the second end 14 of the microwave foodstuff package 10. In the depicted embodiment, the package 10 includes a third corner seal 66 in which the first panel 20 is attached to the gusset panel 40 between the first panel bottom edge fold 22 and the gusset panel fold 42. The third corner seal 66 is located between the second end seal 60 and the first end 12 of the package 10. In one or more embodiments, the third corner seal 66 may be in the form of a continuous line of attachment extending from the second end seal 60 to the first panel bottom edge fold 22. In particular, the third corner seal 66 may intersect the second end seal 60 at a location intermediate the opening edge fold 16 and the first panel bottom edge fold 22. Even more particularly, the third corner seal 66 may intersect the second end seal 60 at a location that is closer to the gusset panel fold 42 than either of the opening edge fold 16 or the first panel bottom edge fold 22.

In one or more embodiments, the third corner seal 66 may limit the passage of material between the first panel 20 and the gusset panel 40 towards the corner of the package as defined at the junction between the second end seal 60 and the first panel bottom edge fold 22. To limit the passage of material to that corner, the third corner seal 66 may or may not be in the form of a continuous line of attachment extending from the second end seal 60 to the first panel bottom edge fold 22. For example, in one or more embodiments, the third corner seal 66 may be provided as only one point of attachment between the first panel 20 and the gusset panel 40 along a third corner seal line that extends through the third corner seal 66 along its length from the second end seal 60 to the first panel bottom edge fold 22. In one or more alternative embodiments, the third corner seal 66 may be provided as two or more points of attachment between the first panel 20 and the gusset panel 40 along a third corner seal line that extends through the third corner seal 66 along its length from the second end seal 60 to the first panel bottom edge fold 22.

A third corner seal 66 is visible in the view of the illustrative embodiment of microwave foodstuff package 10 seen in FIG. 3. Referring to FIG. 4, the opposite side of the microwave foodstuff package 10 formed by second panel 30 is seen in a plan view along with a fourth corner seal 67 that is formed between the second panel 30 and the gusset panel 40. In one or more embodiments, the fourth corner seal 67 may preferably, but not necessarily, be similar in all characteristics to the third corner seal 66 formed between the first panel 20 and the gusset panel 40.

As a result, the fourth corner seal 67 involves attachment of the second panel 30 to the gusset panel 40 between the second panel bottom edge fold 32 and the gusset panel fold 42. The fourth corner seal 67 is located between the second end seal 60 and the first end 12 of the package 10. In one or more embodiments, the fourth corner seal 67 may be in the form of a continuous line of attachment extending from the second end seal 60 to the second panel bottom edge fold 32. In particular, the fourth corner seal 67 may intersect the second end seal 60 at a location intermediate the opening edge fold 16 and the second panel bottom edge fold 32. Even more particularly, the fourth corner seal 67 may intersect the second end seal 60 at a location that is closer to the gusset panel fold 42 than either of the opening edge fold 16 or the second panel bottom edge fold 32.

In one or more embodiments, the fourth corner seal 67 may limit the passage of material between the second panel 30 and the gusset panel 40 towards the corner of the package as defined at the junction between the second end seal 60 and the second panel bottom edge fold 32. To limit the passage of material to that corner, the fourth corner seal 67 may not be in the form of a continuous line of attachment extending from the second end seal 60 to the second panel bottom edge fold 32. For example, in one or more embodiments, the fourth corner seal 67 may be provided as only one point of attachment between the second panel 30 and the gusset panel 40 along a fourth corner seal line that extends through the fourth corner seal 67 along its length from the second end seal 60 to the second panel bottom edge fold 32. In one or more alternative embodiments, the fourth corner seal 67 may be provided as two or more points of attachment between the second panel 30 and the gusset panel 40 along a fourth corner seal line that extends through the fourth corner seal 67 along its length from the second end seal 60 to the second panel bottom edge fold 32.

In one or more embodiments, second end seal 60 may also include a first gusset portion (i.e., the portion of the second end seal 60 in which the first panel 20 is attached to the gusset panel 40 as described above) and a second gusset portion (i.e. the portion of end seal 60 in which the second panel 30 is attached to the gusset panel 40 as described above). The first gusset portion and the second gusset portion of the second end seal 60 may, in one or more embodiments, also be connected to each other at a location that is proximate the first panel bottom edge fold 22 and the second panel bottom edge fold 32. As used in this context, the term "proximate" has the same meaning as described above in connection with the first end seal 50. In one or more embodiments, the first gusset portion and the second gusset portion of the second end seal 60 may be attached to each other along the entire length of the first gusset portion and the second gusset portion from, respectively, the gusset panel fold 42 to the first panel bottom edge fold 22 and the second panel bottom edge fold 32.

One or more embodiments of the microwave stuff packages described herein may, as depicted in the cross-sectional view of FIG. 5, also include a microwave susceptor 36. In particular, the shape of the microwave susceptor 34 may vary and the microwave susceptor 36 can be formed of any suitable material such as, e.g., a metallized plastic film. Although depicted as located on the interior surface of the second panel 30, the microwave foodstuff packages described herein may include one or more microwave susceptors that may be located in a variety of locations within the packages. In other words, the particular form and/or location of one or more microwave susceptors that may be used in packages as described herein may vary widely.

The microwave susceptor 36 is also seen in the plan view of FIG. 6 where the microwave susceptor 36 it is depicted in broken lines because it is located within the interior of the package 10 and, therefore, not visible through the second panel 30. Also depicted in FIG. 6 is foodstuff 11 which, in the depicted embodiment, is located on or proximate the microwave susceptor 36.

As noted above in connection with FIGS. 1, 3 and 5, one or more embodiments of the microwave foodstuff packages described herein may include an opening feature located proximate the opening edge fold of the packages. The opening feature 70 depicted in those views may be in the form of, e.g., a thread, string, rope, wire, cable, etc. Some potential alternative embodiments of opening features that may be used in connection with the microwave foodstuff packages described herein are depicted in FIGS. 7-9B.

Figure 7:
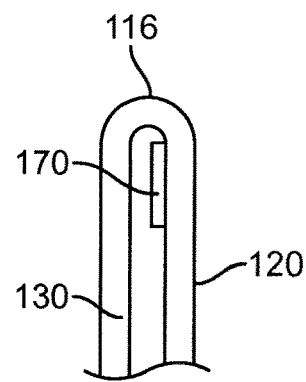
FIG. 7 is an enlarged cross-sectional view of another illustrative embodiment of an opening feature defining a line of separation proximate the opening edge fold of a microwave foodstuff package as described herein.

The alternative embodiment of opening feature 170 depicted in FIG. 7 is in the form of a tape or other flattened article (i.e., the article that is not in the form of a round or rounded thread, string, rope, wire, cable, etc.) that is located within the package between first panel 120 and second panel 130. The opening feature 170 is located proximate the opening edge fold 116 (where "proximate" has the same meaning as described herein with respect to opening feature 70). The opening feature 170 defines, in one or more embodiments, a line of separation proximate the opening edge fold 116 along which the package can be opened as described herein.

Figure 8A:
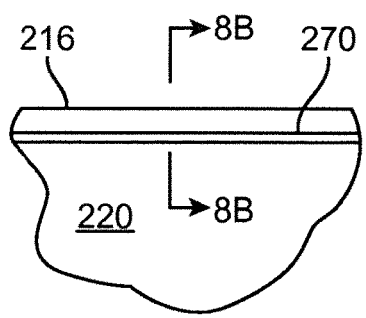
FIG. 8A is a plan view of a portion of an opening edge fold of a microwave foodstuff package as described herein depicting another illustrative embodiment of an opening feature defining a line of separation proximate the opening edge fold.
Figure 8B:
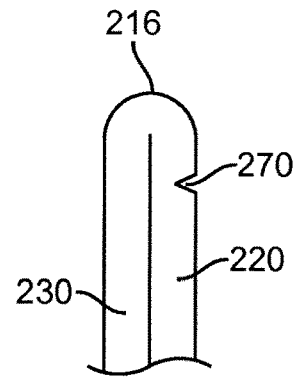
FIG. 8B is an enlarged cross-sectional view of the portion of the opening edge fold of the microwave foodstuff package as depicted in FIG. 8A taken along line 8B-8B in FIG. 8A.

The alternative embodiment of opening feature 270 depicted in FIGS. 8A and 8B is in the form of a line of weakness that is formed in the first panel 220. Although the single line of weakness of opening feature 270 is depicted as being formed in the exterior surface of the first panel 220, in one or more alternative embodiments one or more lines of weakness may be provided in one or more of the exterior surface of the first panel 220, interior surface of the first panel 220, the exterior surface of the second panel 220, and the interior surface of the second panel 230. The line of weakness of opening feature 270 defines, in one or more embodiments, a line of separation proximate the opening edge fold 216 along which the package can be opened as described herein.

Figure 9A:
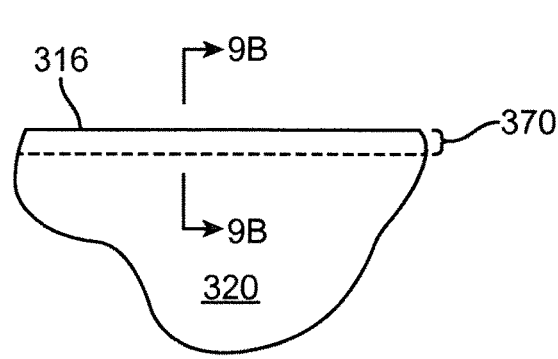
FIG. 9A is a plan view of a portion of an opening edge fold of a microwave foodstuff package as described herein depicting another illustrative embodiment of an opening feature defining a line of separation proximate the opening edge fold.
Figure 9B:
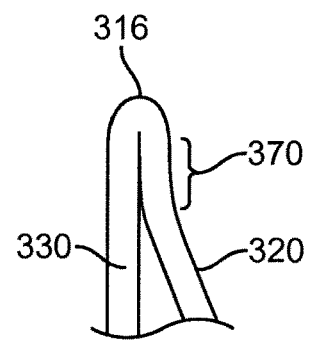
FIG. 9B is an enlarged cross-sectional view of the portion of the opening edge fold of the microwave foodstuff package as depicted in FIG. 9A taken along line 9B-9B in FIG. 9A.

The alternative embodiment of opening feature 370 depicted in FIGS. 9A and 9B is in the form of a bond formed between the first panel 320 and the second panel 330. Forming a bond between the two layers of sheet material forming the first panel 320 and the second panel 330 proximate the opening edge fold 316 may, in one or more embodiments, provide a region of the package that has increased tensile strength to allow for separation of the sheet material along a defined line of separation proximate the opening edge fold 316 to open a package as described herein.

Although a variety of different embodiments of opening features are described individually, in one or more embodiments, packages as described herein may include combinations of two or more of these opening features to potentially improve the predictability of separation of the sheet material along a selected line of separation. Furthermore, it should be understood that the specific embodiments of opening features as described herein are not to be construed as limiting. For example, other forms of opening features such as opening features in the form of perforations, thinning of the sheet material, oriented materials such as oriented paper which exhibits a preferential tear direction, etc. may be used in the microwave foodstuff packages as described herein.

Figure 10:
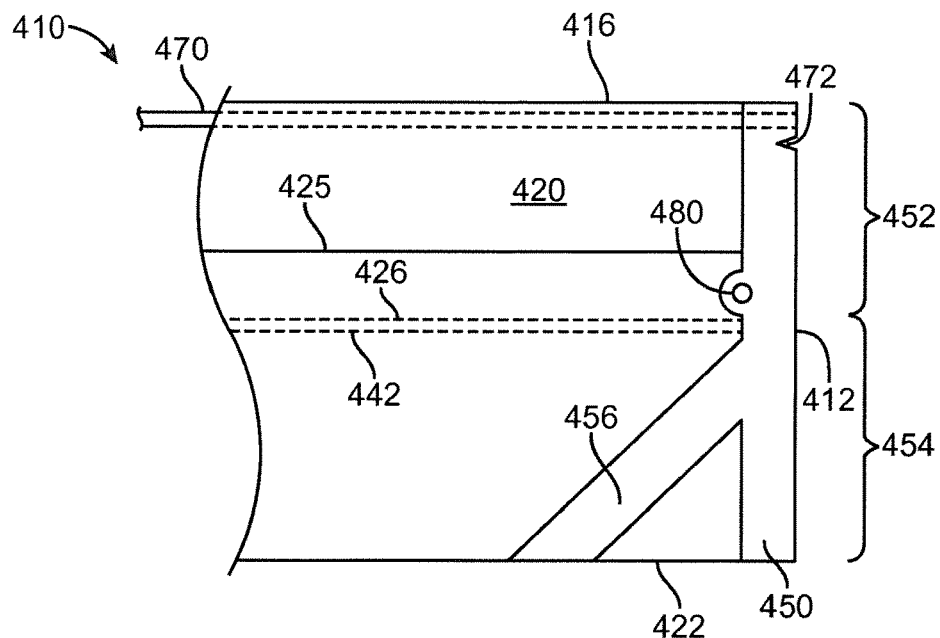
FIG. 10 is a plan view of a portion of another illustrative embodiment of a microwave foodstuff package as described herein, wherein the view is taken from the first panel side of the package.
Figure 11:
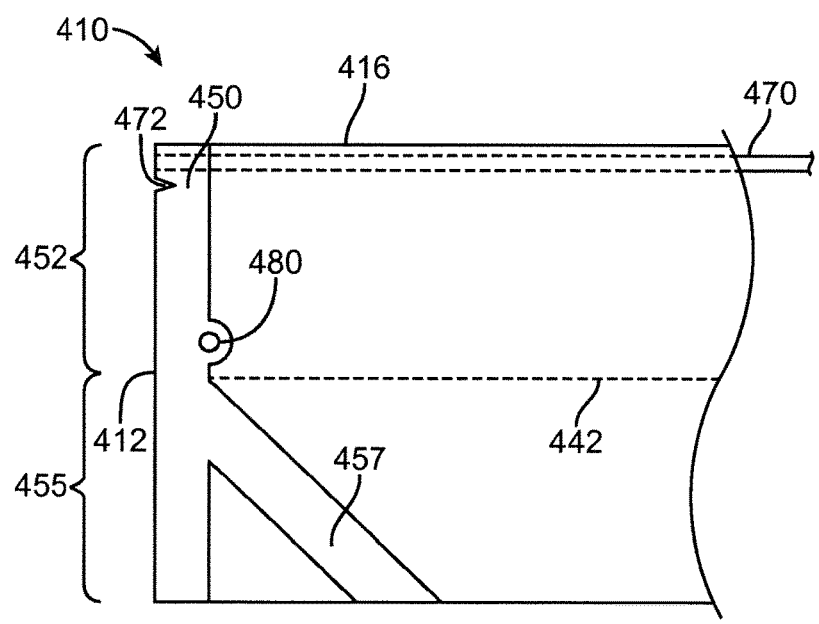
FIG. 11 is a plan view of the portion of the microwave foodstuff package as depicted in FIG. 10 taken from the second panel side of the package, i.e., the opposite side of the view depicted in FIG. 10.

A portion of an alternative embodiment of a microwave foodstuff package 410 is depicted in FIGS. 10 and 11. In particular, the portion of the package 410 including the first end 412, first end seal 450 and other features is depicted in these figures. Among the features depicted in FIGS. 10 and 11 which are also found in the illustrative embodiment depicted in FIGS. 1-6 are first panel 420, second panel 430, opening edge fold 416, first panel bottom edge fold 422, second panel bottom edge fold 432, gusset panel fold 442 (which is depicted in a broken line because it is hidden from view in FIGS. 10 and 11), opening feature 470 (a portion of which is depicted in a broken line because it is hidden from view in FIGS. 10 and 11), first end seal 450, first corner seal 456 and second corner seal 457. Also seen in FIG. 10 are features related to the overlap seal including exterior sheet material edge 425 and interior sheet material edge 426 (which is shown in a broken line because it is also hidden from view in FIG. 10).

It should be noted that the portions of the first end seal 450 as described above in connection with the embodiment depicted in FIGS. 1-6 are called out in FIGS. 10 and 11. In particular, the panel portion 452 of the first end seal 450 is indicated in FIGS. 10 and 11 and extends from the opening edge fold 416 to the gusset panel fold 442. Further, the first gusset portion 454 of the first end seal 450 which extends from the gusset panel fold 442 to the first panel bottom edge fold 422 is also depicted in FIG. 10. The second gusset portion 455 of the first end seal 450 which extends from the gusset panel fold 442 to the second panel bottom edge fold 432 is also depicted in FIG. 11.

Among the features that are depicted in FIGS. 10 and 11 that are not found in the embodiment depicted in FIGS. 1-6 are a tear nick 472 and vent hole 480. The tear nick 472 may be provided to, in one or more embodiments, provide a convenient location at which separation of the sheet material using the opening feature 470 may be initiated. Although the illustrative embodiment of tear nick 472 is formed as a notch, a tear nick provided in one or more alternative embodiments of the microwave stuff packages as described herein may be provided in any suitable form, e.g., a cut line, etc. Although the depicted embodiment of package 410 includes a tear nick 472 formed along the first end 412 of the package 410, one or more embodiments of the packages as described herein may include a tear nick at either the first end or second end of the package or at both ends of the package.

One or more vent holes 480 may be provided in one or both of the end seals of the microwave foodstuff packages as described herein. In one or more embodiments, the vent hole 480 may be provided as an aperture that is formed through all layers of the sheet material at the location of the vent hole 480. The vent hole 480 may, in one or more embodiments, be provided to release steam from the interior of the package 410 during microwave heating by separation of the sheet materials between the interior edge of the end seal 450 and the perimeter of the vent hole 480. The location of the vent hole 480 may be adjusted such that the width of the end seal 450 separating the vent hole 480 from the interior of the package 410 changes. Adjusting that seal width can be used to change the venting characteristics of the vent hole 480. In particular, adjusting the width of the end seal 450 separating the vent hole 480 from the interior of the package 410 may change the time and/or pressure at which the vent hole 480 may provide an opening through which steam located in the package 410 can escape.

The end seals of one or more embodiments of the microwave foodstuff packages described herein may include a gusset portion extending from the gusset panel fold to the first panel bottom edge fold in which the first panel is attached to the gusset panel. In such a gusset portion of an end seal, the first or second panel is attached to the gusset panel within a corner area bounded by the end of the package, the panel bottom edge fold and a corner seal line extending from the gusset panel fold to the panel bottom edge fold.

Figure 12:
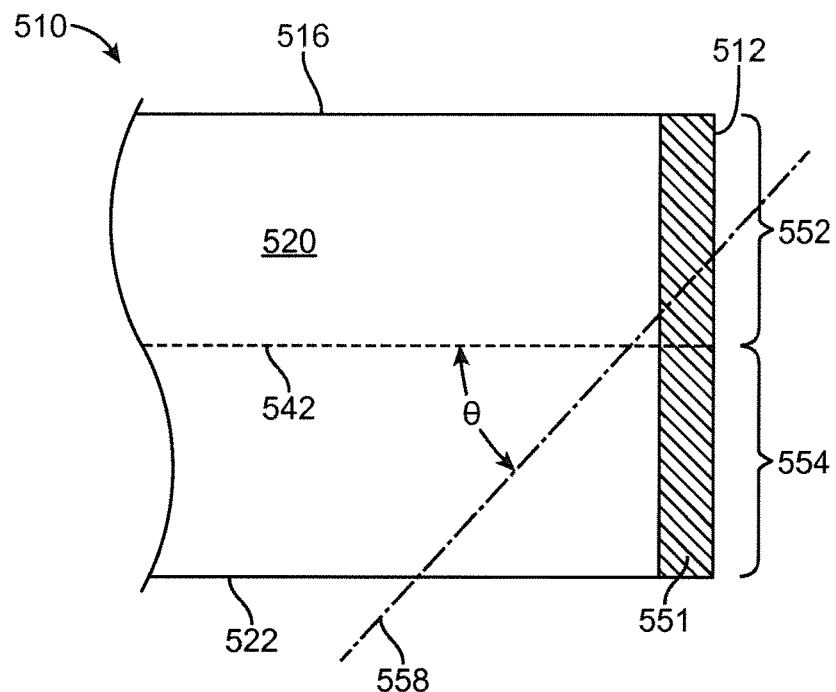
FIG. 12 is a plan view of a portion of another illustrative embodiment of a microwave foodstuff package including a corner seal line as described herein.
Figure 13:
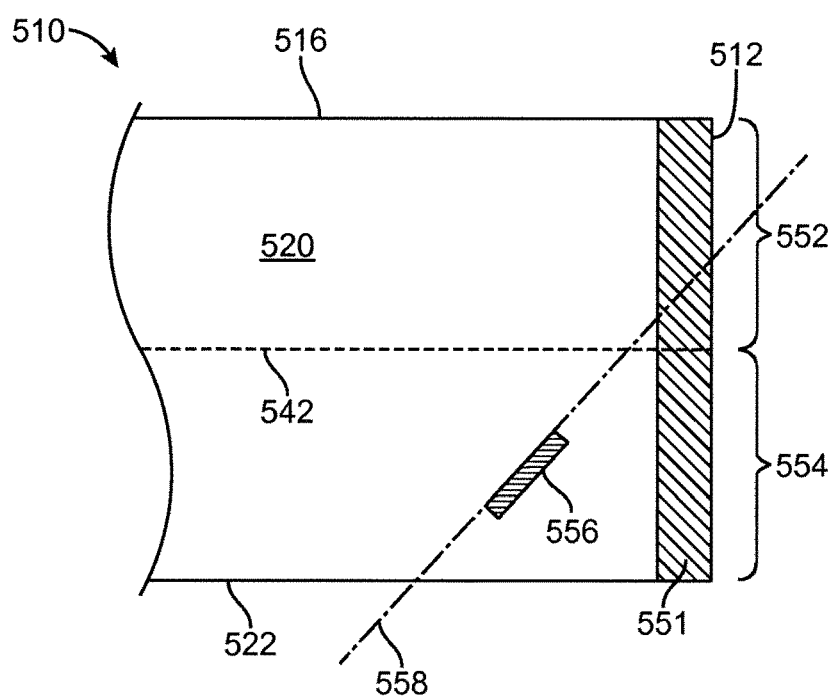
FIG. 13 is a plan view of the microwave foodstuff package of FIG. 12 including a corner seal and a first panel edge seal.
Figure 14:
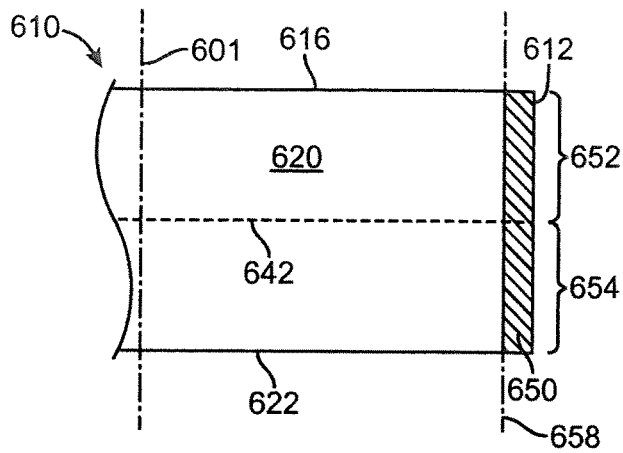
FIG. 14 is a plan view of another illustrative embodiment of a microwave foodstuff package including an end seal that is formed by a panel portion and a first panel edge seal.

A variety of illustrative embodiments of end seals having such a construction are depicted in FIGS. 12-17, although only a portion of the microwave foodstuff packages are depicted in those figures. In particular, the depicted portions include the first ends of the packages and, therefore, include only the first end seals. It should be understood that the second ends of the illustrative embodiments of the packages depicted in FIGS. 12-17 may include second end seals that may, in one or more embodiments, have features that are mirror images of the features depicted and described in connection with the first end seals. In particular, one illustrative embodiment of such a mirror line 601 is depicted in FIG. 14. In one or more embodiments, the mirror line 601 bisects the package 610 from the opening edge fold 616 to the first panel bottom edge fold 622 (and the second panel bottom edge fold which is not seen in FIG. 14).

Furthermore, the depicted views are of the first panels of the packages, and it should be understood that the packages are constructed according to the principles described herein and, therefore, include a second panel facing the first panel and that the attachments made between the first panel and the gusset panel along the first end of the package will, in one or more embodiments, be made in a mirror image between the gusset panel and the second panel on the opposite sides of the packages. Finally, the end seals depicted in FIGS. 12-17 are shaded (cross-hatched) in areas in which the first panels are attached to the second panel or the gusset panel as described herein.

One illustrative embodiment of an end seal including a gusset portion 554 defined by a corner seal line 558 is depicted in FIGS. 12-13. Similar to the other packages described herein the microwave foodstuff package 510 includes an opening edge fold 516 and a first panel bottom edge fold 522. The package 510 also includes a gusset panel fold 542 located between the opening edge fold 516 and the first panel bottom edge fold 522.

The end seal provided in connection with microwave foodstuff package 510 includes a panel portion 552 and gusset portion 554. As with the embodiments of end seals described above, the panel portion 552 of the end seal is located between the opening edge fold 516 and the gusset panel fold 542. The first panel 520 is attached to the second panel (not shown) in the area occupied by the panel portion 552 of the end seal. The gusset portion 554 of the end seal is located between the gusset panel fold 542 and the first panel bottom edge fold 522. The first panel 520 is attached to the gusset panel (not shown) in the area occupied by the gusset portion 554 of the end seal.

Another feature depicted in FIGS. 12 and 13 is a corner seal line 558. In one or more embodiments, the corner seal line 558 defines a corner area of the gusset portion of the end seal in which the first panel 520 is attached to the gusset panel. More specifically, the corner area is bounded by the first end 512 of the package 510, the first panel bottom edge fold 522, and the portion of the corner seal line 558 which extends from gusset panel fold 542 to the first panel bottom edge fold 522;

Although not depicted in FIGS. 12 and 13, the end seal of the microwave foodstuff package 510 includes a second gusset portion extending from the gusset panel fold 542 to the second panel bottom edge fold in which the second panel is attached to the gusset panel, The second panel is attached to the gusset panel within a second corner area of the second gusset portion that is bounded by the first end 512 of the package 510, the second panel bottom edge fold, and a second corner seal line extending from the gusset panel fold 542 to the second panel bottom edge fold on the opposite side of the package from that seen in FIGS. 12 and 13.

In one or more embodiments, the corner seal line 558 that defines the corner area forms an included angle θ (theta) with the gusset panel fold 542 as seen in FIG. 12. Although the corner seal line 558 is depicted in the figures as being in the form of a generally straight line, in one or more alternative embodiments, the corner seal line may not necessarily be perfectly straight and may have some curvature or variations along its length. Such alternative embodiments may, however, be approximated by a straight line that would form an angle with the gusset panel fold 542 as described herein.

In one or more embodiments, the corner seal line 558 may form an included angle θ (theta) of 90° or less with the gusset panel fold 542. In one or more alternative embodiments, the corner seal line 558 may form an included angle θ (theta) of 60° or less with the gusset panel fold 542. In one or more alternative embodiments, the corner seal line 558 may form an included angle θ (theta) of 30° or more with the gusset panel fold 542. In one or more alternative embodiments, the corner seal line 558 may form an included angle θ (theta) of 30° or more and 60° or less with the gusset panel fold 542.

In one or more embodiments, the gusset portion 554 of the end seal 550 may include a first panel edge seal 551 that is aligned with an edge of the first end 512 of the package 510 and extends between the gusset panel fold 542 and the first panel bottom edge fold 522. The first panel edge seal 551 of the gusset portion 554 of the end seal extends inwardly towards the second end of the package 510 (it being understood that the second end of the package 510 is located on an opposite end of the package 510 from the first end 512 depicted in FIGS. 12 and 13). Taken together, the panel portion 552 of the first end seal and the first panel edge seal 551 of the gusset portion 554 of the end seal 550 provide a seal that extends continuously along first end 512 of the package 510 from the opening edge fold 516 to the first panel bottom edge fold 522 (as well as the second panel bottom edge fold on the opposite side of the package 510).

In one or more embodiments, the gusset portion 554 of the end seal may also include a corner seal 556 that is located between the corner seal line 558 and the panel edge seal 551. In one or more embodiments, the corner seal 556 is discontinuous such that a portion of the first panel 520 is not attached to the gusset panel along the corner seal line 558. In the example depicted in FIG. 13, the corner seal 556 does not extend to the first panel bottom edge fold 522, nor does it extend to the panel portion 552 or the first panel edge seal 551 of the end seal. As a result, portions of the first panel 520 are not attached to the gusset panel along the corner seal line 558. Further, the illustrative embodiment of package 510 depicts an arrangement in which the first panel 520 is not attached to the gusset panel in a portion of the corner area bounded by the panel edge seal 551 and the corner seal 556. As discussed herein, the package 510 may, in one or more embodiments, include a similar gusset panel seal connecting the second panel to the gusset panel on the opposite side of the package 510 (which is not seen in FIGS. 12 and 13).

In one or more embodiments of the microwave foodstuff packages described herein, the end seals may be located solely along the end of the package. One illustrative embodiment of a package 610 that may include an end seal 650 that is located solely along the end of the package is depicted in FIG. 14. The microwave foodstuff package 610 includes an opening edge fold 616, a first panel bottom edge fold 622, a first panel 620, and a gusset panel fold 642.

The end seal 650 of the package 610 includes a panel portion 652 located between the opening edge fold 616 and the gusset panel fold 642. The end seal 650 also includes a gusset portion 654 located between the gusset panel fold 642 and the first panel bottom edge fold 622. As described herein, the gusset portion 654 may be located solely along the first and 612 of the package 610. In terms of the corner seal lines described herein, the package 610 may be described as including a corner seal line 658 that forms an included angle with the gusset panel fold 642 of 90° such that the innermost edge of the gusset portion 654 of the end seal 650 is generally aligned with the and 612 of the package 610.

Figure 15:
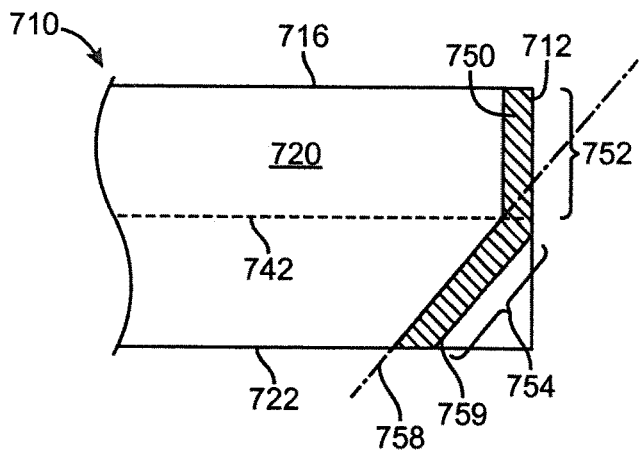
FIG. 15 is a plan view of another illustrative embodiment of a microwave foodstuff package including an end seal that is formed by a panel portion and a first panel corner seal.

Yet another alternative illustrative embodiment of a microwave stuff package as described herein is depicted in FIG. 15. The microwave foodstuff package 710 depicted in FIG. 15 includes a first panel 720, an opening edge fold 716, a first panel bottom edge fold 722, and a gusset panel fold 742. The package 710 also includes an end seal 750 located along the end 712 of the package 710. The end seal 750 includes a panel portion 752 located between the opening edge fold 716 and the gusset panel fold 742 in which the first panel 720 is attached to a second panel on an opposite side of the microwave foodstuff package 710.

The end seal 750 also includes a gusset portion 754 that extends between the gusset panel fold 742 and the first panel bottom edge fold 722. Unlike the gusset portion 654 depicted in connection with package 610 in FIG. 14, the gusset portion 754 of the end seal 750 of package 710 is not located along the edge of the first and 712 of the package 710. Rather, the gusset portion 754 of the end seals 750 angles inwardly from the gusset panel fold 742 to the first panel bottom edge fold 722. In one or more embodiments, the gusset portion 754 of the end seal 750 may be in the form of a corner seal that is continuous between the gusset panel fold 742 and the first panel bottom edge fold 722 as depicted in FIG. 15. In such an embodiment, the corner seal/gusset portion 754 forms a continuous seal between the first panel 720 and the gusset panel from the gusset panel fold 742 to the first panel bottom edge fold 722. In one or more embodiments, such as that depicted in FIG. 15, the corner seal/gusset portion 754 intersects with the panel portion 752 of the first end seal 750 such that the panel portion 752 of the first end seal 750 and the corner seal/gusset portion 754 form a continuous seal extending from the opening edge fold 716 to the first panel bottom edge fold 722.

Figure 16:
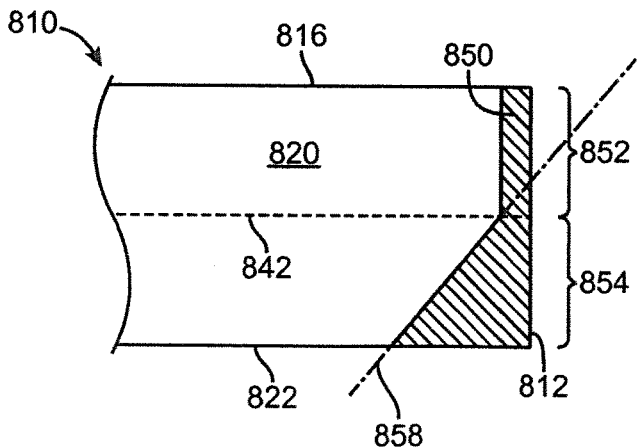
FIG. 16 is a plan view of another illustrative embodiment of a microwave foodstuff package including another illustrative embodiment of an end seal.

In one or more embodiments of the microwave foodstuff packages described herein, the end seal may include a first panel edge seal and the first corner seal that, together, occupy all of the first corner area such that the first panel is attached to the gusset panel within all of the first corner area of the first gusset portion of the first end seal. One illustrative embodiment of a microwave foodstuff package as described herein that includes an end seal that occupies all of the corner area defined by the corner seal line is depicted in FIG. 16.

In particular, microwave foodstuff package 810 includes a first panel 820, an opening edge fold 816, a first panel bottom edge fold 822, and a gusset panel fold 842 a described in connection with the other illustrative embodiments of the microwave foodstuff packages described herein. The microwave foodstuff package 810 includes an end seal 850 that includes a panel portion 852 located between the opening edge fold 816 and the gusset panel fold 842 in which the first panel 820 is attached to a second panel on an opposite side of the microwave foodstuff package 810. The end seal 850 also includes a gusset portion 854 that, in the depicted embodiment occupies substantially all of the area bounded by the end 812 of the package 810, the first panel bottom edge fold 822, the corner seal line 858, and the gusset panel fold 842.

Figure 17:
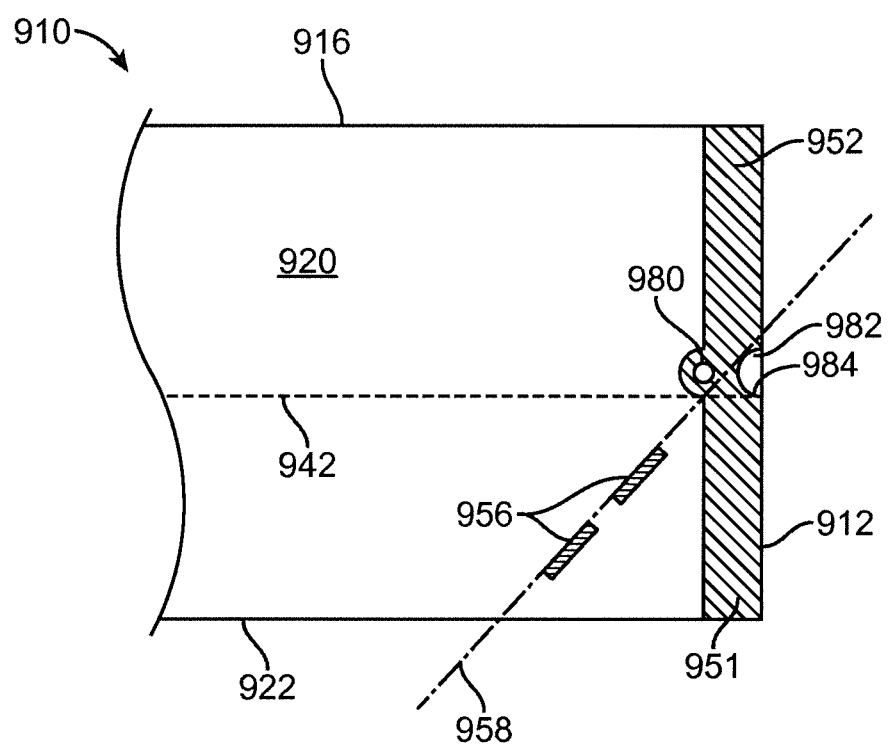
FIG. 17 is a plan view of another illustrative embodiment of a microwave foodstuff package including a vent.

Another illustrative embodiment of a microwave foodstuff package 910 is depicted in FIG. 17 and includes variations in some of the features described in connection with other illustrative embodiments of the microwave foodstuff packages described herein.

One feature depicted in FIG. 17 is a corner seal that includes two corner seals 956 located between the first corner seal line 958 and the first panel edge seal 951. In one or more embodiments, the corner seals 956 provide another illustrative embodiment of a discontinuous corner seal in which a portion of the first panel 920 is not attached to the gusset panel along the first corner seal line 958. Further, the illustrative embodiment of package 910 depicts another arrangement in which the first panel 920 is not attached to the gusset panel in a portion of the corner area bounded by a first panel edge seal 951 and the corner seal line 958.

Another feature depicted in connection with microwave foodstuff package 910 in FIG. 17 is an alternative arrangement for a vent hole 980. As described herein, one or more embodiments of the microwave foodstuff packages may include a vent hole 980 formed through the first and second panels proximate the first end 912 of the package 910. In one or more embodiments, the vent hole 980 may be located along the first end 912 of the package 910 in the area of the panel portion 952 (connecting the first panel 920 to the second panel on the opposites side of the package above the gusset panel fold 942). As seen in FIG. 17, a portion of the panel portion 952 of the end seal is located between the vent hole 980 and the second end of the package (wherein the second end of the package 910 is located at the opposite end of the package).

The variation in the vent hole 980 depicted in connection with microwave foodstuff package 910 is found in the unattached area 982 bounded by seal line 984 (which, in one or more embodiments, intersects with the vent hole 980). More specifically, the first panel 920 and the opposing second panel are not attached to each other in the unattached area 982. As a result, when the panel portion 952 of the end seal is penetrated by moisture vapor and/or gases during heating of product in the package 910 such that the moisture vapor and/or gases reach the vent hole 980, the moisture vapor and/or gases can exit the package 910 without restriction by any attachment between the first panel 920 and a second panel on the side of the vent hole 980 between the vent hole 980 and the first end 912 of the package 910.

Figure 18:
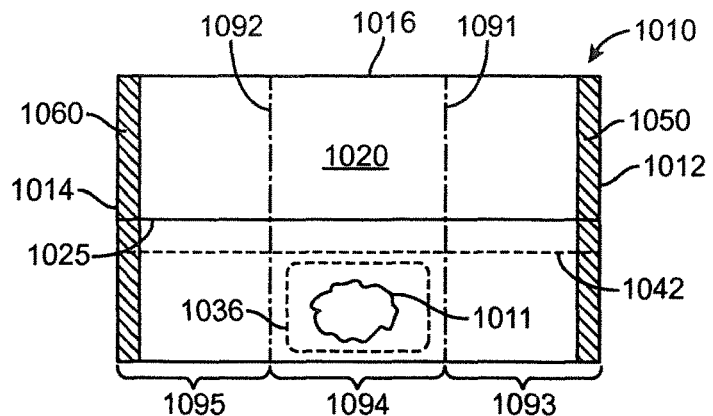
FIG. 18 is a plan view of another illustrative embodiment of a microwave foodstuff package that may be provided in a Z-fold configuration as described herein.
Figure 19:
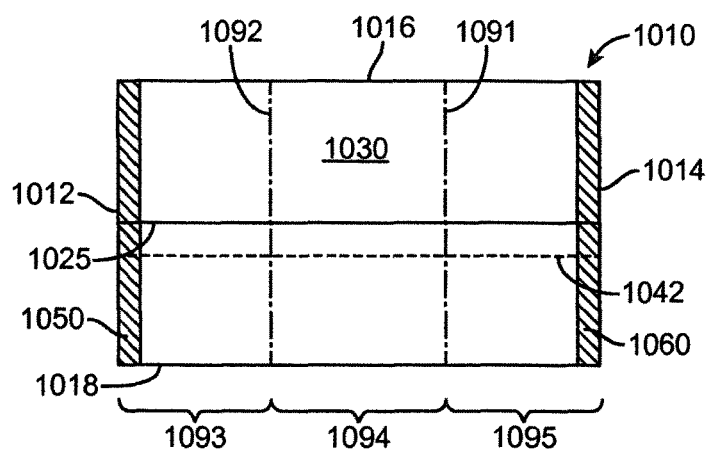
FIG. 19 is a plan view of the opposite side of the package depicted in FIG. 18.
Figure 20:
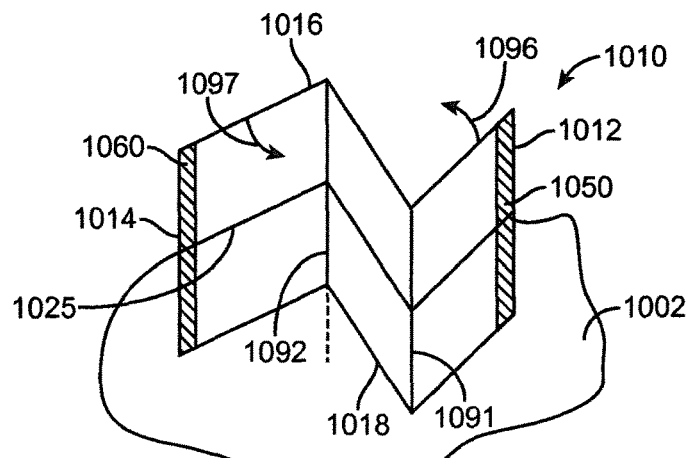
FIG. 20 is a perspective view of the package depicted in FIGS. 18 and 19, the package being folded along cross-package folds into a Z-fold configuration and standing on a support surface in a microwave oven.

FIGS. 18-20 depict another illustrative embodiment of a microwave foodstuff package having a Z-fold configuration as described herein. The microwave foodstuff package 1010 includes a first panel 1020 and a second panel 1030. The first panel 1020 is attached to the second panel 1030 at a first end seal 1050 along a first end 1012 of the package 1010. The first panel 1020 is also attached to the second panel 1030 at a second end seal 1060 along a second end 1014 of the package 1010. Further, the first panel 1020 is attached to the second panel 1030 along a first side edge 1016 extending from the first end seal 1050 to the second end seal 1060 of the package 1010. In one or more embodiments, the first side edge 1016 may be constructed similar to the opening edge folds of the illustrative embodiments described elsewhere herein.

The first panel 1020 is also attached to the second panel 1030 along a second side edge 1018 extending from the first end seal 1050 to the second end seal 1060 of the package 1010. The package 1010 includes an interior volume located between the first panel 1020, the second panel 1030, the first and second end seals of the package 1050 and 1060, and the first and second side edges 1016 and 1018.

To provide a Z-fold configuration, the package 1010 includes a first cross-package fold 1091 extending from the first side edge 1016 to the second side edge 1018 and a second cross-package fold 1092 extending from the first side edge 1016 to the second side edge 1018. The first cross-package fold 1091 defines a first portion 1093 of the package 1010 that is located between the first end seal 1050 of the package 1010 and the first cross-package fold 1091. The second cross-package fold 1092 defines a second portion 1095 of the package 1010 that is located between the second end seal 1060 of the package 1010 and the second cross-package fold 1092. The first cross-package fold 1091 and the second cross-package fold 1092 define a central portion 1094 located between the first and second cross-package folds 1091 and 1092.

When folded in a Z-fold configuration, the first portion 1093 faces the second panel 1030 in the central portion 1094 when folded along the first cross-package fold 1091 as seen in, e.g., FIG. 20, where arrow 1096 depicts rotation of the first portion 1093 about the axis defined by the first cross-package fold 1091 towards the central portion 1094 during the folding process. The second portion 1095 faces the first panel 1020 in the central portion 1094 when folded along the second cross-package fold 1092 as seen in, e.g., FIG. 20, where arrow 1097 depicts rotation of the second portion 1095 about the axis defined by the second cross-package fold 1092 towards the central portion 1094 during the folding process.

One alternative manner of characterizing the process of forming the package 1010 into a Z-fold configuration may include describing that the package 1010 is folded along the first and second cross-package folds 1091 and 1092 in opposite directions. In other words, the first and second panels 1020 and 1030 are folded in a first direction (e.g., the direction indicated by arrow 1096) along the first cross-package fold 1091, while the first and second panels 1020 and 1030 are folded in a second direction (e.g., the direction indicated by arrow 1097) that is opposite from the first direction along the second cross-package fold 1092.

In one or more embodiments of the packages having a Z-fold configuration as described herein, foodstuff 1011 as seen in FIG. 18 may be provided in the interior volume formed within the package 1010. In one or more embodiments, the package 1010 may also include a microwave susceptor 1036 as described herein. In packages having a Z-fold configuration, the foodstuff 1011 and/or the microwave susceptor 1036, if provided in a package, may be preferentially located within the central portion 1094 of the packages having a Z-fold configuration.

In one or more embodiments of the packages having a Z-fold configuration as described herein, the package 1010 may further include an overlap seal 1025 located in the first panel 1020 between the first side edge 1016 and the second side edge 1018. As described herein in connection with other illustrative embodiments of packages, the overlap seal 1025 may include two layers of sheet material forming at least a portion of the first panel 1020 and at least a portion of the second panel 1030. In one or more embodiments, the overlap seal 1025 extends from the first end seal 1050 to the second end seal 1060 of the package 1010.

The packages described herein that have a Z-fold configuration may include any or all of the features described herein with respect to the packages having a single gusset. For example, in one or more embodiments, the packages having a Z-fold configuration may include a vent hole formed through the first and second panels 1020 and 1030 proximate at least one of the first end seal 1050 and the second end seal 1060 (where proximate means that the vent is closer to the recited end seal than the other end seal). One illustrative example of a vent seal that may be incorporated into a package having a Z-fold configuration is depicted in connection with FIGS. 10-11.

As another example, the packages having a Z-fold configuration may include a first side edge 1016 in the form of an opening edge fold formed by a fold in sheet material that forms at least a portion of both the first panel 1020 and the second panel 1030. The packages may also include a gusset panel as described herein in connection with the packages having a single gusset. In one or more embodiments of a package having a Z-fold configuration and including a gusset panel, the first panel 1020 may be attached to the second panel 1030 along the second side edge 1018 of the package 1010 by a gusset panel located between the first panel 1020 and the second panel 1030. In such an embodiment, the gusset panel is attached to the first panel along a first panel bottom edge fold located along the second side edge 1018 of the package (see, e.g., FIGS. 1 and 2, where gusset panel 40 is attached to first panel 20 along a first panel bottom edge fold 22). Further, the gusset panel in such an embodiment is attached to the second panel 1030 along a second panel bottom edge fold located along the second side edge 1018 of the package (see, e.g., FIGS. 1 and 2, where gusset panel 40 is attached to a second panel 30 along a second panel bottom edge fold 32). In such an embodiment, the gusset panel includes a gusset panel fold 1042 (see, e.g., FIGS. 18-19) that is located between the first panel 1020 and the second panel 1030. The gusset panel fold 1042 extends from the first end seal 1050 to the second end seal 1060 of the package 1010.

The preceding paragraph described only some examples of the features described herein with respect to the packages having a single gusset that may be incorporated into packages having a Z-fold configuration as described herein. As noted above, any and/or all of the features described above in connection with packages having a single gusset may be incorporated into a package having a Z-fold configuration. Conversely, any package having a single gusset as described herein may be folded in a Z-fold configuration as described herein in connection with FIGS. 18-20.

Packages having a Z-fold configuration as described herein may provide an opportunity for a method of heating a product in a microwave oven that differs from conventionally packaged products. In particular, one or more embodiments of methods of heating of product in a microwave oven as described herein may include standing a Z-folded package as described herein on a side edge on a support surface 1002 located within a microwave oven (see, e.g., FIG. 20 where package 1010 is depicted as standing on support surface 1002 on its second side edge 1018). In such a method, the first and second folds define first and second fold lines 1091 and 1092 that extend upward from the support surface 1002, with the first and second panels 1020 and 1030 are folded in a first direction 1096 along the first fold line 1091, and the first and second panels 1020 and 1030 are folded in a second direction 1097 opposite from the first direction 1096 along the second fold line 1092.

With the package 1010 oriented on the support surface 1002 in a microwave oven as depicted in, e.g., FIG. 20, foodstuff located within an interior volume of the package 1010 may be heated using microwave energy while the Z-folded package 1010 is standing on the support surface 1002. In one or more embodiments in which the package 1010 includes a gusset panel and a gusset panel fold as described herein, the gusset panel will open along the second side edge 1018 as the package 1010 expands.

The microwave foodstuff packages described herein may be made of a variety of different sheet materials suitable for use in delivering foodstuffs for heating by microwave energy. Those skilled in the art will understand the parameters which need to be met by the sheet materials used to manufacture the packages. In one or more embodiments, those parameters may include flexibility, transparency to microwave energy, ability to withstand high temperatures (e.g. temperatures up to about 190° C. when popping popcorn), permeability to oils or fats associated with the foodstuff located in the package, etc. Furthermore, the materials used must also be amenable to the techniques used to form the end of seals, corner seals, overlap seals, etc. that may form a part of the package.

Although a variety of different microwave foodstuff packages are described herein, the relative dimensions of the various features (e.g., the size and shape of the first panel, second panel, gusset panel, etc.) can be adjusted to provide microwave foodstuff packages having different shapes when expanded and opened. Those different shapes will, however, typically be similar in features to those depicted herein.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the microwave foodstuff packages or methods are discussed herein and some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A package for microwave heating of a product, the package comprising:
   a first panel extending from a first end to a second end of the package, wherein the first panel also extends from an opening edge fold to a first panel bottom edge fold in a direction transverse to the opening edge fold;
   a second panel facing the first panel and extending from the first end to the second end of the package, wherein the second panel also extends from the opening edge fold to a second panel bottom edge fold in a direction transverse to the opening edge fold; and
   a gusset panel located between the first panel and the second panel, the gusset panel extending from the first panel bottom edge fold to the second panel bottom edge and comprising a gusset panel fold located between the first panel and the second panel, wherein the gusset panel fold extends from the first end to the second end of the package wherein the package only includes a single gusset constituted by the gusset panel.

2. A package for microwave heating of product, the package comprising:
   a first panel extending from a first end to a second end of the package, wherein the first panel also extends from an opening edge fold to a first panel bottom edge fold in a direction transverse to the opening edge fold;
   a second panel facing the first panel and extending from the first end to the second end of the package, wherein the second panel also extends from the opening edge fold to a second panel bottom edge fold in a direction transverse to the opening edge fold;
   a gusset panel located between the first panel and the second panel, the gusset panel extending from the first panel bottom edge fold to the second panel bottom edge fold and comprising a gusset panel fold located between the first panel and the second panel, wherein the gusset panel fold extends from the first end to the second end of the package;
   an opening feature defining a line of separation proximate the opening edge fold, wherein the opening edge fold is formed in sheet material that forms at least a portion of the first panel and at least a portion of the second panel, and wherein the opening feature is configured to form an opening into the package by separating the sheet material along the line of separation over a majority of a length of the package as measured from the first end to the second end along the opening edge fold; and
   a first end seal at the first end of the package, the first end seal comprising a panel portion extending from the opening edge fold to the gusset panel fold in which the first panel is attached to the second panel, a first gusset portion extending from the gusset panel fold to the first panel bottom edge fold in which the first panel is attached to the gusset panel, and a second gusset portion extending from the gusset panel fold to the second panel bottom edge fold in which the second panel is attached to the gusset panel.

3. A package according to claim 2 wherein, after forming the opening using the opening feature, the package comprises a bottom formed by the gusset panel and side walls formed by the first and second panels.

4. A package according to claim 2, wherein the line of separation defined by the opening feature extends from the first end to the second end of the package.

5. A package according to claim 2, wherein the opening feature comprises an opening member attached to the sheet material, and wherein the opening member is configured to form an opening into the package by separating the sheet material along the line of separation when the opening member is pulled away from the first panel bottom edge fold.

6. A package according to claim 5, wherein the opening member is positioned between the first and second panels.

7. A package according to claim 5, wherein the opening member is adhesively attached to the sheet material.

8. A package according to claim 5, wherein the opening member extends through the first end seal, and wherein the opening member is configured to separate the sheet material along a line that extends through the first end seal when the opening member is pulled away from the first panel bottom edge fold at a location beginning proximate the second end of the package.

9. A package according to claim 2, wherein the opening feature comprises a line of weakness formed in at least of the first panel and the second panel.

10. A package according to claim 2, further comprising a second end seal at the second end of the package that is a mirror image of the first end seal along a mirror line that bisects the package from the opening edge fold to the first and second bottom edge folds.

11. A package according to claim 2, further comprising an overlap seal located in the first panel between the opening edge fold and the first panel bottom edge fold, the overlap seal comprising two layers of the sheet material forming at least a portion of the first panel and at least a portion of the second panel, wherein the overlap seal extends from the first end of the package to the second end of the package.

12. A package according to claim 2, wherein the first panel is attached to the gusset panel within a first corner area bounded by the first end of the package, the first panel bottom edge fold and a first corner seal line extending from the gusset panel fold to the first panel bottom edge fold; and the second panel is attached to the gusset panel within a second corner area bounded by the first end of the package, the second panel bottom edge fold, and a second corner seal line extending from the gusset panel fold to the second panel bottom edge fold.

13. A package according to claim 12, wherein the first corner seal line forms an included angle of 90 degrees or less with the gusset panel fold.

14. A package according to claim 12, wherein the first gusset portion of the first end seal comprises a first panel edge seal that is aligned with an edge of the first end of the package between the gusset panel fold and the first panel bottom edge fold, wherein the first panel edge seal extends inwardly towards the second end of the package from the first end of the package.

15. A package according to claim 14, wherein the first gusset portion of the first end seal comprises a first corner seal located between the first corner seal line and first panel edge seal.

16. A package according to claim 15, wherein the first corner seal is discontinuous such that a portion of the first panel is not attached to the gusset panel along the first corner seal line.

17. A package according to claim 14, wherein the first corner seal is continuous between the gusset panel fold and the first panel bottom edge fold such that the first corner seal forms a continuous seal between the first panel and the gusset panel from the gusset panel fold to the first panel bottom edge fold.

18. A package according to claim 17, further comprising an overlap seal located in the first panel between the opening edge fold and the first panel bottom edge fold, the overlap seal comprising two layers of the sheet material forming at least a portion of the first panel and at least a portion of the second panel, wherein the overlap seal extends from the first end of the package to the second end of the package.

19. A package for microwave heating of product, the package comprising:
a first panel and a second panel;
wherein the first panel is attached to the second panel at a first end seal along a first end of the package and a second end seal along a second end of the package, and wherein the first panel is attached to the second panel along a first side edge extending from the first end seal to the second end seal of the package, and further wherein the first panel is attached to the second panel along a second side edge extending from the first end seal to the second end seal of the package, wherein the package comprises an interior volume located between the first panel, the second panel, the first and second end seals of the package, and the first and second side edges;
a first cross-package fold extending from the first side edge to the second side edge and a second cross-package fold extending from the first side edge to the second side edge; and
foodstuff located in the interior volume of the package;
wherein the package comprises a first portion located between the first end seal of the package and the first cross-package fold, a second portion located between the second end seal of the package and the second cross-package fold, and a central portion located between the first and second cross-package folds; and
wherein the first portion faces the second panel in the central portion when folded along the first cross-package fold and the second portion faces the first panel in the central portion when folded along the second cross-package fold.

20. A package according to claim 19, further comprising an overlap seal located in the first panel between the first side edge and the second side edge, the overlap seal comprising two layers of sheet material forming at least a portion of the first panel and at least a portion of the second panel, wherein the overlap seal extends from the first end seal to the second end seal of the package.

* * * * *